US010706073B1

(12) United States Patent
Tamkin et al.

(10) Patent No.: US 10,706,073 B1
(45) Date of Patent: Jul. 7, 2020

(54) PARTITIONED BATCH PROCESSING FOR A USAGE ANALYSIS SYSTEM

(71) Applicant: Amazon Technologies, Inc., Reno, NV (US)

(72) Inventors: Preston Alan Tamkin, Seattle, WA (US); Phillip Lloyd Dunham, Seattle, WA (US); Oleksiy Khudoliy, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 834 days.

(21) Appl. No.: 14/559,868

(22) Filed: Dec. 3, 2014

(51) Int. Cl.
*G06F 16/27* (2019.01)
*G06F 16/23* (2019.01)

(52) U.S. Cl.
CPC .......... *G06F 16/278* (2019.01); *G06F 16/23* (2019.01)

(58) Field of Classification Search
USPC ........................................................ 707/609
See application file for complete search history.

(56) References Cited

U.S. PATENT DOCUMENTS

| 6,470,388 | B1 * | 10/2002 | Niemi | G06F 11/3476 |
| | | | | 709/223 |
| 7,149,736 | B2 * | 12/2006 | Chkodrov | G06Q 10/087 |
| 7,490,045 | B1 * | 2/2009 | Flores | G06Q 10/10 |
| | | | | 702/62 |
| 8,135,827 | B2 * | 3/2012 | Wilson | G06F 9/542 |
| | | | | 709/224 |
| 8,713,157 | B2 * | 4/2014 | Dowling | G06F 11/3051 |
| | | | | 709/203 |
| 2002/0083003 | A1 * | 6/2002 | Halliday | G06Q 30/04 |
| | | | | 705/52 |
| 2007/0150599 | A1 * | 6/2007 | Neogi | G06F 11/3495 |
| | | | | 709/227 |

(Continued)

OTHER PUBLICATIONS

Tang C, Steinder M, Spreitzer M, Pacifici G. A scalable application placement controller for enterprise data centers. InProceedings of the 16th international conference on World Wide Web May 8, 2007 (pp. 331-340). (Year: 2007).*

(Continued)

*Primary Examiner* — Mohsen Almani
(74) *Attorney, Agent, or Firm* — Robert C. Kowert; Kowert, Hood, Munyon, Rankin & Goetzel, P.C.

(57) ABSTRACT

A usage analysis service that obtains session events from application instances, updates usage metrics for the application instances according to the session events, and stores or updates aggregated usage metrics for each application according to the session events. Updates for the instance usage metrics may be partitioned according to instance identifier, collected in batches, and applied to respective instance records in an instances table by one or more instance update nodes. Updates for the aggregated usage metrics may be partitioned according to application identifier, collected in batches, processed to combine multiple updates, and applied to respective aggregate records in an application usage table by multiple application usage update nodes. The system may provide an interface that retrieves aggregated usage metrics from the application usage table and presents application usage information for the applications to consumers.

20 Claims, 15 Drawing Sheets

(56) References Cited

U.S. PATENT DOCUMENTS

| | | | |
|---|---|---|---|
| 2008/0167977 A1* | 7/2008 | Auvenshine | G06F 9/5061 705/34 |
| 2009/0198543 A1* | 8/2009 | Pastorelli | G06F 21/121 705/59 |
| 2010/0157989 A1 | 6/2010 | Krzyzanowski et al. | |
| 2012/0143694 A1* | 6/2012 | Zargahi | G06Q 30/0603 705/14.66 |
| 2013/0316703 A1* | 11/2013 | Girard | G06Q 20/145 455/432.1 |
| 2014/0215081 A1* | 7/2014 | Cili | H04L 47/24 709/227 |
| 2014/0359271 A1* | 12/2014 | Gedik | H04L 12/6418 713/100 |
| 2015/0032887 A1* | 1/2015 | Pesek | G06F 21/305 709/224 |
| 2015/0052260 A1 | 2/2015 | Bott | |
| 2015/0112791 A1* | 4/2015 | Jain | G06Q 30/0269 705/14.41 |
| 2016/0277511 A1* | 9/2016 | Fang | G06Q 20/145 |

OTHER PUBLICATIONS https://developer.amazon.com/appsandservices/community/post/Tx1SYB9LZMISN02/Ann, "Announcing Amazon GameCircle—A New Gaming Experience for Kindle Fire", Amazon, Downloaded Mar. 3, 2015, pp. 1-5.

https://developer.amazon.com/public/apis/engage/gamecircle/docs/create-a-gamecircle-conf, "Create a GameCircle Configuration", Amazon Apps & Services Developer Portal, Downloaded Mar. 3, 2015, pp. 1-5.

https://web.archive.org/web/20141010233624/https://developer.amazon.com/public/apis/en, "Get Set up for GameCircle", Amazon Apps & Game Developer Portal, Download Mar. 3, 2015, pp. 1-6.

http://aws.amazon.com/about-aws/whats-new/2014/07/10/introducing-amazon-mobile-analy . . . , "Introducing Amazon Mobile Analytics", Amazon Web Services, Downloaded Mar. 3, 2015, pp. 1-2.

Amazon Web Services, "Amazon Kinesis Developer Guide", API Version, Dec. 2, 2013, pp. 1-51.

Amazon Web Services, "AWS SDK for Android 2.3 Developer Guide", 2014, pp. 1-32.

U.S. Appl. No. 14/559,864, filed Dec. 3, 2014, Preston Alan Tamkin.

* cited by examiner session event 112

| <device ID> | <application ID> | <platform> | <event type> | <date/time> | ... |

FIG. 4A application usage update 114

| <application ID> | <platform> | <new> | DAD+1 | MAD+1 | +session time | ... |

FIG. 4B application instances 140

| <device ID> | <application ID> | <first session> | <last session> | <retention> | <session count> | <session time> | ... |
|---|---|---|---|---|---|---|---|
| <device ID> | <application ID> | <first session> | <last session> | <retention> | <session count> | <session time> | ... |

•
•
•

FIG. 4C application usage 150

| <application ID> | <platform> | <time range> | <total devices> | <daily active devices> | <monthly active devices> | <retention> | <session count> | <session time> | ... |
|---|---|---|---|---|---|---|---|---|---|
| <application ID> | <platform> | <time range> | <total devices> | <daily active devices> | <monthly active devices> | <retention> | <session count> | <session time> | ... |

PARTITIONED BATCH PROCESSING FOR A USAGE ANALYSIS SYSTEM

BACKGROUND

Evolution of the Internet, web-based computing, and mobile computing, including the increasingly widespread availability of broadband connections and the availability and capabilities of consumer computing devices including but not limited to mobile computing devices such as laptop/notebook computers, pad/tablet devices, and smartphones, has led to continuing evolution and growth of mobile applications. Mobile application providers may want to analyze how users actually use their mobile applications. However, a given mobile application may be instantiated on anywhere from tens, hundreds, to millions of mobile devices, and a given mobile device may include many different mobile applications. The instances of a single mobile application may generate millions of usage events in a day, and collectively mobile applications may generate many billions of usage events daily.

BRIEF DESCRIPTION OF THE DRAWINGS

FIG. 4A illustrates an example session event, according to some embodiments of a usage analysis system.

FIG. 4B illustrates an example application usage update generated for a session event, according to some embodiments of a usage analysis system.

FIG. 4C illustrates example records in an application instances table, according to some embodiments of a usage analysis system.

FIG. 4D illustrates example records in an application usage table, according to some embodiments of a usage analysis system.

Figure 1:
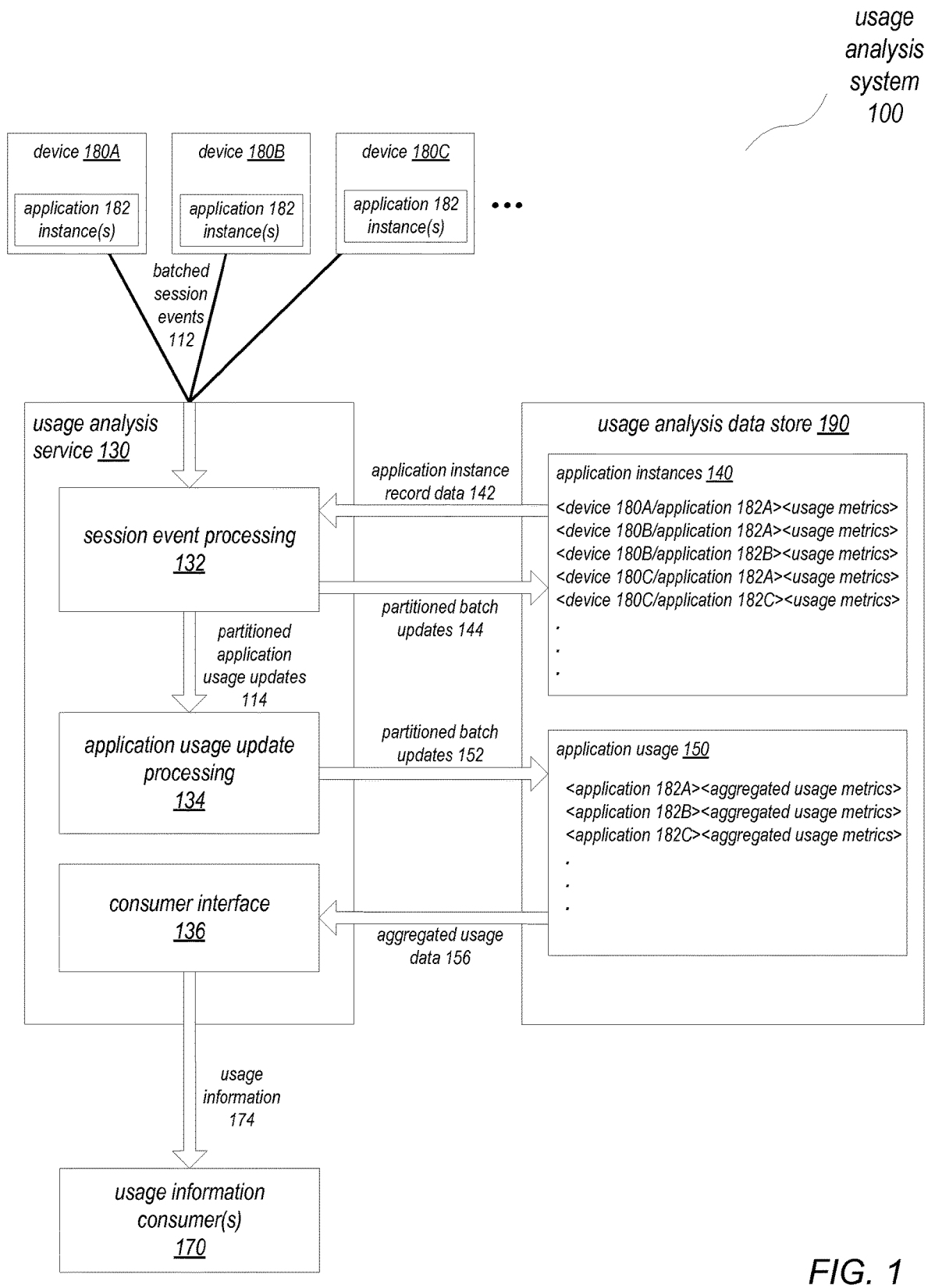
FIG. 1 illustrates an example usage analysis system, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Introduction

Various embodiments of methods and apparatus for collecting, processing, storing, and presenting usage information for applications including but not limited to mobile applications are described. Embodiments of a usage analysis system may include a usage analysis service that obtains session events from instances of various applications installed on various consumer devices (e.g., mobile devices including but not limited to laptop/notebook computers, pads/tablets, and smartphones), updates usage metrics for application instances according to the session event data, and stores or updates aggregated usage metrics for each application according to the application instance usage metrics. The usage analysis system may provide an interface that presents aggregated usage information for the applications to one or more entities (e.g., to mobile application providers or developers), referred to herein as usage information consumers.

In some embodiments, the usage analysis service may process session events received from application instances on the devices to generate usage and business metrics for applications in real-time or near real-time as the session events are received. FIG. 4A illustrates an example session event. As used herein, a session is a measurable amount of time that a user is using an application instance on a given device. In some embodiments, session events may include session start events and session stop events for respective application instances on respective devices. A session start event may be generated when an application instance is opened, and a session stop event may be generated when the application instance is closed. In some embodiments, session stop events may also indicate session length. The session length is tracked by the application instance, and may be used to track events on the device such as pauses, context switches, and so on.

In some embodiments, each application instance may be identified by a unique identifier. In some embodiments, each application may be identified by a unique application identifier (application ID), and each device on which the application is instantiated may be identified by a unique device identifier (device ID). In some embodiments, the device ID and application ID may be included in the session events generated by the application instances on the devices. In some embodiments, a combination or concatenation of the device ID and the application ID may form an application instance identifier (application instance ID) that uniquely identifies a particular application instance on a particular device within the usage analysis system. However, in some embodiments, other methods may be used to provide unique application instance IDs.

In some embodiments, the usage analysis service maintains an application instances table (or tables) that includes a separate row or record for each known application instance of each application being monitored by the usage analysis service. FIG. 4C illustrates example records in an application instances table. In some embodiments, the usage analysis service also maintains an application usage table (or tables) that includes a separate row or record for each application being monitored by the usage analysis service. In some embodiments, for each application being monitored by the usage analysis service, the application usage table (or tables) may include a separate row or record for each time period (e.g., each day) that the application has been monitored, with a new row or record added for the application for each new time period. Each application usage record may include one or more aggregated usage metrics for the respective application that are updated by the usage analysis service. FIG. 4D illustrates example records in an application usage table.

Whenever a session event is input into the usage analysis service, the unique application instance ID specified in the session event data is looked up in the application instances table. Using the data contained in the session event as well as the data stored in the application instance record (if found), the usage analysis service may determine or calculate new usage data. The new usage data may include new values for the application instance record in the application instances table, or a new application instance record including the new values if an application instance record was not found for this application instance ID. In some embodiments, the usage analysis service may also generate an application usage update for each session event indicating changes (e.g., as increments) for one or more of the aggregated usage metrics of the respective application in the application usage table. FIG. 4B illustrates an example application usage update.

In some embodiments, to facilitate processing of the session event data, the usage analysis system may partition the session events according to the unique application instance ID (e.g., device ID+application ID) included in the session events. Partitioning, as used herein, refers to separating input data records into multiple groups or partitions according to one or more keys, and storing or streaming the data according to the partitions. The partitioned data may then be separately processed or consumed by different nodes or threads of the usage analysis service. For example, in some embodiments, the usage analysis service maintains an application instances table (or tables) that includes a separate row or record for each known application instance of each application being monitored by the usage analysis service. In some embodiments of the usage analysis system, the session events may be partitioned using the device ID and application ID included in the session events as a key that uniquely identifies the application instances, and each partition may be separately processed to create a new or update an existing application instance record in the application instances table. In some embodiments, instead of independently processing each session event in a partition to update the application instances table, the partitioned session events may be collected into batches, and one or more batch processing threads or nodes may periodically process the batches of partitioned session events to update the application instances table.

In some embodiments, the usage analysis service maintains an application usage table (or tables) that includes a separate row or record for each application being monitored by the usage analysis service. In some embodiments, for each application being monitored by the usage analysis service, the application usage table (or tables) may include a separate row or record for each time period (e.g., each day) that the application has been monitored, with a new row or record added for the application for each new time period. Each application usage record may include one or more aggregated usage metrics for the respective application that are updated by the usage analysis service. In some embodiments, in processing the session events to generate new records for or updates to the application instances table, the usage analysis service also generates application usage updates for the application records in the application usage table. In some embodiments, an application ID is included in each application usage update record. In some embodiments, each application usage update indicates one or more increments to be added to the values of one or more aggregated usage metrics in a respective application usage record. In some embodiments, to facilitate processing of the application usage updates into the application usage table, the usage analysis service may partition the application usage updates using the application ID that uniquely identifies each application being monitored as the partitioning key. The partitioned application usage updates may then be separately processed or consumed by different nodes or threads of the usage analysis service to update the respective application usage records in the application usage table. In some embodiments, instead of independently processing each application usage update in a partition to update the application usage table, the partitioned application usage updates may be collected into batches, and one or more batch processing threads or nodes may periodically process the batches of partitioned application usage updates into the application usage table.

In some embodiments, the usage analysis system may include a data integrity monitor that implements a rules-based engine that applies rules to the aggregated usage metrics generated by the usage analysis system to validate the integrity of the usage data. For example, the data integrity monitor may apply a rule to verify that the current value of a particular usage metric (e.g., the total number of unique devices for an application) is correct in relation to the current value of another usage metric (e.g., the total number of unique devices for the application in a given time period). In some embodiments, the rules that are applied by the data integrity monitor may specify tolerances for particular metrics to help prevent false positives. In some embodiments, an appropriate action or actions are taken when a discrepancy is discovered; for example, the provider of the usage analysis service and/or the consumer of the usage information may be notified to report the discrepancy.

In some embodiments, the data integrity monitor may periodically or aperiodically check the integrity of one or more of the aggregated usage metrics for one or more of the applications that are stored in the application usage table. In some embodiments, the data integrity monitor may check the integrity of the aggregated usage metrics for an application in response to an access of the application's aggregated usage data by a usage information consumer (e.g., the developer or provider of the respective application) via the consumer interface of the usage analysis service. In some embodiments, a copy of the aggregated usage data accessed by the consumer may be temporarily stored or cached by the data integrity monitor until the data integrity monitor performs its integrity check. Performing the data integrity checks for aggregated usage metrics on copies of data accessed by the consumers may reduce the number of accesses to the application usage table. The data integrity checks may be performed on copies of the accessed data "offline" by the data integrity monitor so that latency is not introduced into the consumers' accesses of the usage information.

Example Usage Analysis System

FIG. 1 illustrates an example usage analysis system 100, according to at least some embodiments. The usage analysis system 100 may include a usage analysis service 130 that receives or collects session events from one or more application 182 instances on each of a plurality of devices 180. The usage analysis service 130 processes the session event data to store or update usage metrics for each unique application 182 instance and aggregated usage metrics for each unique application 182. The usage analysis service 130 presents usage information for the applications 182 to one or more usage information consumers 170, for example application developers or providers.

Devices 180 may include computing devices including but not limited to mobile computing devices such as laptop/notebook computers, pad/tablet devices, and smartphones. Applications 182 may be or may include mobile applications, and may be any type or category of application including but not limited to games, social media applications, utility applications, entertainment (e.g., media player) applications, educational applications, business applications, reference applications, and so on. Each device 180 may include one or more application 182 instances, for example instances of mobile applications implemented on mobile devices 180. The application 182 instances may be provided for the various operating system (OS) platforms on the various types of devices 180. For example, device 180A may implement an instance of an application 182A, device 180B may implement an instance of application 182A and an instance of an application 182B, and device 180C may implement an instance of application 182A and an instance of an application 182C.

In some embodiments, each application 182 instance on each device 180 may generate session events (e.g., session start and session stop events) and send the session events to the usage analysis service 130, for example via a wired and/or wireless connection to an intermediate network such as the Internet. In some embodiments, as an alternative to sending each session event to the usage analysis service 130, an application 182 instance or a device 180 may collect batches of session events and periodically or aperiodically send the batched session events to the usage analysis service 130. For example, in some embodiments, an application 182 instance may send batches of session events to the service 130 once an hour, or once a day.

Usage analysis service 130 may include one or more components, layers, or modules. For example, as illustrated in FIG. 1, usage analysis service 130 may include a session event processing 132 module, an application usage update processing 134 module, and a consumer interface 136. In some embodiments, the session event processing 132 module may receive and process session events 112 to generate updates for application instance usage metrics and application aggregated usage metrics. In some embodiments, the session event processing 132 module may read or access application instance record data 142 corresponding to the received session events from the application instances 140 table on data store 190, calculate or otherwise determine at least one update to the application instance usage metrics according to the session events, and update one or more fields in one or more of the application instance records according to the updates. In some embodiments, the session event processing 132 module may apply the update(s) to the application instance records read from the application instances 140 table and then write the updated records back to the application instances 140 table on data store 190. Alternatively, the session event processing 132 module may apply at least some updates directly to the records in the application instances 140 table on data store 190 using update commands that increment or otherwise modify values in fields of the records without reading and writing the records.

In some embodiments, the session event processing 132 module may pass the updates for the application aggregated usage metrics determined for the session events to the application usage update processing 134 module. The application usage update processing 134 module may then apply the updates to the application usage 150 table. In some embodiments, the application usage update processing 134 module may apply at least some updates directly to the records in the application usage 150 table on data store 190 using update commands that increment or otherwise modify values in fields of the records without reading and writing the records.

Figure 9:
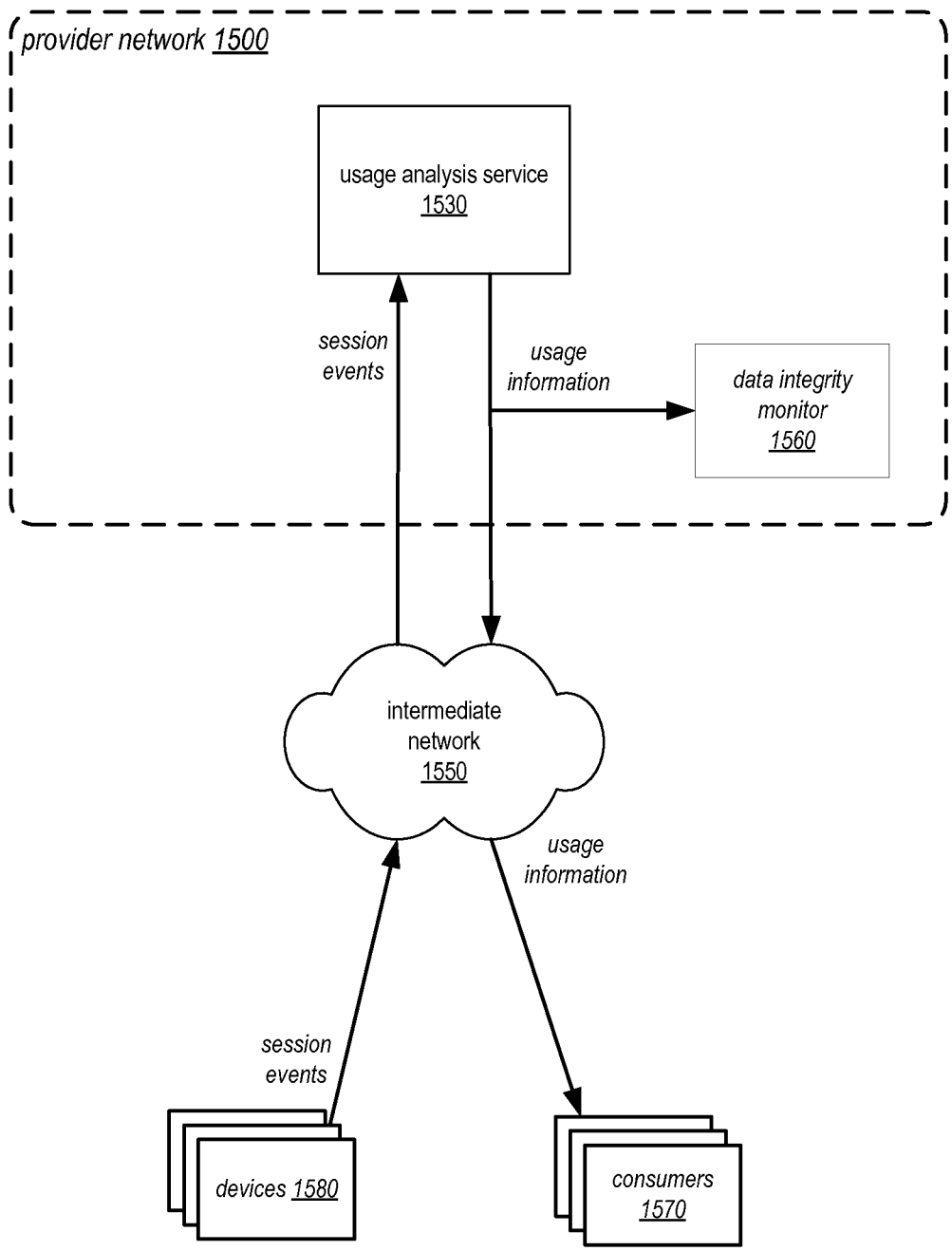
FIG. 9 illustrates an example service provider network environment in which embodiments of a usage analysis system may be implemented.

In some embodiments, the usage analysis system 100 may be implemented in the context of a service provider that provides virtualized resources (e.g., virtualized computing resources, virtualized storage resources, virtualized database (DB) resources, etc.) on a provider network to clients of the service provider, for example as illustrated in FIG. 9. In some embodiments, the usage analysis service 130 may be implemented at least in part according to the services and virtualized resources of a provider network as illustrated in FIG. 9. In some embodiments, the usage analysis service 130 may leverage virtualized computing resources of the provider network to implement one or more of session event processing 132 module, application usage update processing 134 module, and consumer interface 136.

In some embodiments, the consumer interface 136 component or module may provide one or more user interfaces (UIs) and/or application programming interfaces (APIs) via which usage information consumer(s) 170 or other entities can access and view usage information 174 generated from aggregated usage data 156 accessed from application usage 150 table from their computing devices. For example, consumer interface 136 may present a web page UI to consumer(s) 170 via web browsers on computing devices; a consumer 170 may access and view usage information 174 for a particular application 182 as textual and/or graphical data via the web page UI. In some embodiments, the consumer interface 136 may provide other functionalities; for example, the consumer interface 136 may allow a consumer to add applications 182 to or remove applications 182 from the usage analysis system 100, to configure or reconfigure parameters or settings used in monitoring a given application 182 by the usage analysis service 130, and so on.

In some embodiments, the usage analysis service 130 may implement and maintain a usage analysis data store 190 that stores application instances 140 data and application usage 150 data. In some embodiments, the usage analysis service 130 may leverage virtualized storage or DB resources provided by a data storage or DB service of the provider network to implement and maintain the usage analysis data store 190 including the application instances 140 data and application usage 150 data. In some embodiments, the application instances 140 data and application usage 150 data may be maintained by the storage or DB service as key-value stores, in relational tables, or according to other data schemas, structures or formats or combinations thereof. In at least some embodiments, the storage or DB service may provide one or more APIs via which the modules of the usage analysis service 130 may access the data stored in the data store 190. The section titled Data storage service example and FIG. 11 describe embodiments of an example database service that may be used as a data storage service in at least some embodiments of a usage analysis system 100.

In some embodiments, the storage or DB service and APIs used by the usage analysis system 100 (e.g., the database service illustrated in FIG. 11) may allow the values in data elements or records in the tables 140 and 150 to be updated without reading the elements or records. In these embodiments, the usage analysis service 130 may apply updates to records in the tables 140 and/or 150 without reading the records by issuing updates that identify data elements in the records to be updated and values to be added to the current values of the data elements.

The service provider and provider network environment, via one or more provider network services, may provide flexible provisioning of resource instances to the usage analysis service 130 in which virtualized computing, storage, and/or DB resource instances or capacity can be automatically added to or removed from the usage analysis service 130 implementation on the provider network in response to changes in demand or usage, thus enabling the usage analysis service 130 implementation to automatically scale to handle throughput, computation, and/or data storage needs. For example, one or more additional computing, storage, and/or DB resources may be automatically added to the components or modules of the usage analysis service 130 implementation in response to an increase in the number of devices 180 sending session events to the usage analysis service 130 and/or to an increase in the number of applications 182 being tracked by the service 130 implementation. In some embodiments, if and when usage drops below a threshold, virtualized resources that are no longer necessary can be removed from the service 130 implementation.

Example Usage Data

FIGS. 4A through 4D illustrate example data structures, records, elements, and metrics that may be used in some embodiments of a usage analysis system 100, and are not intended to be limiting.

FIG. 4A illustrates an example session event 112, according to some embodiments of a usage analysis system 100. In some embodiments, a session event 112 may include a device ID and application ID that may uniquely identify a particular application instance on a particular device that generated the session event. In some embodiments, a session event 112 may also include a platform identifier that identifies the particular platform (e.g., particular mobile device platform) of the device 180 on which the session event 112 was generated. In some embodiments, a session event 112 may also include an event type. Example event types may include, but are not limited to, session start events and session stop events for the respective application 182 instance on the respective device 180. In some embodiments, other types of events within a session may be indicated in a session event 112. As non-limiting examples, session events that may be indicated in a session event 112 record may include one or more of purchase events that indicate in-application purchases, events that indicate particular features of the application (e.g., the "help" feature) were accessed, events that indicate achievements within the application (e.g., that a certain level or goal was obtained within a game application), and so on. In some embodiments, a session event 112 may also include a date/time stamp for the respective event. In some embodiments, a session event 112 may include other information. For example, a session stop event 112 may indicate a session length or duration. As another example, a purchase event may indicate the amount that was spent on the purchase.

FIG. 4B illustrates an example application usage update 114 generated for a session event, according to some embodiments of a usage analysis system. In some embodiments, the usage analysis service 130, for example a session event processing 132 module of the service 130, may generate an application usage update 114 for each session event 112, the application usage update 114 indicating changes (e.g., as increments) for one or more of the aggregated usage metrics of a respective application in the application usage 150 table. In some embodiments, an application usage update 114 may include an application ID that uniquely identifies a particular application being monitored by the usage analysis system 130. In some embodiments, an application usage update 114 may also include a platform identifier that identifies a particular platform (e.g., particular mobile device platform) on which the application usage update 114 data was generated.

In some embodiments, the storage or DB service and APIs used by the usage analysis system 100 to store the application usage 150 table may allow the values in the data elements or fields of the records to be updated by issuing updates that identify data elements or fields in the record to be updated and values to be added to the current values of the fields. In some embodiments, an application usage update 114 may include one or more fields each indicating a change or update (e.g., increment) for a particular aggregated usage metric in a respective application record in the application usage 150 table. For example, in some embodiments, the application usage update 114 may include an indication that this update corresponds to a new application instance. In some embodiments, the application usage update 114 may include indications that one or more aggregated usage metrics are to be incremented (+1). For example, the aggregated usage metrics for an application may include a daily active devices (DAD) metric that tracks how many devices (application instances) have recorded at least one session on a given day, and the update may indicate that the DAD for this application should be incremented. As another example, the aggregated usage metrics for an application may include a monthly active devices (MAD) metric that tracks how many devices (application instances) have recorded at least one session within a given month (e.g., within a rolling 30-day period), and the update may indicate that the MAD for this application should be incremented. In some embodiments, the application usage update 114 may include indications that one or more aggregated usage metrics are to be incremented by some amount X (+X). For example, the aggregated usage metrics for an application may include one or more metrics that track session time, and the update may indicate that an amount of time X should be added to the session time metric(s) for this application. As another example, the aggregated usage metrics for an application may include a metric that tracks in-application purchases, and the update may indicate that an amount spent X should be added to the in-application purchases metric for this application.

FIG. 4C illustrates example records in an application instances 140 table, according to some embodiments of a usage analysis system. In some embodiments, the application instances 140 table includes a separate row or record for each known instance of each application 182 being monitored by the usage analysis service 130. In some embodiments, each record or row in the application instances 140 table may include a device ID and application ID that uniquely identifies a particular instance of a particular application 182. In some embodiments, an application instance record may also include a platform identifier that identifies the particular platform (e.g., particular mobile device platform) of the device on which the application instance resides.

In some embodiments, an application instance record may include one or more fields each indicating a value for a particular application instance usage metric of the respective application instance. For example, in some embodiments, an application instance record may include a date/time stamp of the first recorded session for this application instance, and a date/time stamp of the last (most recent) recorded session for this application instance. As another example, in some embodiments, an application instance record may include a session count metric indicating a total number of sessions for this application instance, and a session time metric indicating a total amount of session time logged for this application instance. As another example, in some embodiments, an application instance record may include one or more retention metrics for the application instance. A retention metric for an application instance indicates an amount of time (e.g., 1 day, 3 days, 5 days, 1 week, 3 weeks, etc.), measured from the date of the first recorded session of this application instance, that the application instance has been active. For example, 1 day retention indicates that an application instance that recorded at least one session on day X also recorded at least one session on day X+1; 1 week retention indicates that an application instance that recorded at least one session during week Y (days 1-7) also recorded at least one session during week Y+1 (days 8-14). As another example, in some embodiments, an application instance record may include a metric that tracks in-application purchases for this application instances; the metric may indicate a total amount spent for in-application purchases made via this application instance.

FIG. 4D illustrates example records in an application usage 150 table, according to some embodiments of a usage analysis system. In some embodiments, the application usage 150 table includes a separate row or record, or set of rows or records, for each application being monitored by the usage analysis service 130. Each application usage record may include one or more aggregated usage metrics for the respective application that are updated by the usage analysis service.

In some embodiments, each application usage record may include an application ID that uniquely identifies a particular application being monitored by the usage analysis system 130. In some embodiments, each application usage record may also include a platform identifier that identifies a particular platform (e.g., particular mobile device platform) for which the application is supported. In these embodiments, there may be two or more records (or sets of records) for each application being monitored, with one record or set of records for each platform on which the application is supported. In some embodiments, for each application, the application usage 150 table includes a separate application usage record for each time period (e.g., each day) that the application (or application/platform) has been monitored, and each application usage record may include a field that indicates the time range or period (e.g., the day) for which the usage metrics in this record have been aggregated.

In some embodiments, an application usage record may include one or more fields each indicating a value for a particular aggregated usage metric for this particular application (or application/platform). For example, in some embodiments, an application usage record may include a total devices metric that indicates a total number of unique application instances that have been recorded for this application. As another example, in some embodiments, an application usage record may include a daily active devices (DAD) metric that tracks how many devices (application instances) have recorded at least one session on a given day. As another example, in some embodiments, an application usage record may include a monthly active devices (MAD) metric that tracks how many devices (application instances) have recorded at least one session within a given month (e.g., within a rolling 30-day period). As another example, in some embodiments, an application usage record may include a session count metric indicating a total number of sessions for this application across all application instances, and a session time metric indicating a total amount of session time logged for this application across all application instances. As another example, in some embodiments, an application usage record may include one or more retention metrics for the application. A retention metric for an application indicates how many application instances have repeated sessions in an amount of time (e.g., 1 day, 3 days, 5 days, 1 week, 3 weeks, etc.). For example, 1 day retention for an application indicates the number of application instances that recorded at least one session on day X and also recorded at least one session on day X+1; 1 week retention for an application indicates how many application instances recorded at least one session during week Y (days 1-7) and also recorded at least one session during week Y+1 (days 8-14). As another example, in some embodiments, an application usage record may include a metric that tracks in-application purchases for all application instances; the metric may indicate a total amount spent for in-application purchases via all application instances.

Figure 4E:
FIG. 4E illustrates an example update for a record in an application instances table, according to some embodiments of a usage analysis system.

FIG. 4E illustrates an example update 142 for a record in an application instances 140 table as illustrated in FIG. 4C, according to some embodiments of a usage analysis system 100. In some embodiments, an application instance update 142 may include a device ID and application ID that uniquely identifies a particular instance of a particular application 182. In some embodiments, the device ID and application ID in an update 142 may be used to locate a respective record in the application instances 140 table. In some embodiments, if a record matching the device ID and application ID of an update 142 is not found in the table 140, then a new record may be created in the table 140 for this application 182 instance. In some embodiments, an application instance update 142 may also include a platform identifier that identifies the particular platform (e.g., particular mobile device platform) of the device on which the application instance resides.

In some embodiments, an application instance update 142 may include one or more fields, at least one of which may indicate a new value for an application instance usage metric of the respective application instance record in the table 140. For example, in some embodiments, an application instance update 142 may include a date/time stamp of a session for this application instance that is to be recorded in a "last session" field of the respective application instance record. As another example, in some embodiments, an application instance record may include new values for or increments to a session count metric and a session time metric of the respective application instance record. As another example, in some embodiments, an application instance record may include new values for or increments to one or more retention metrics of the respective application instance record.

In some embodiments, the session event processing 132 module may apply the update(s) 142 to application instance records read from the application instances 140 table and then write the updated records back to the application instances 140 table on data store 190. In some embodiments, the storage or DB service and APIs used by the usage analysis system 100 to store the application instances 140 table may allow values in at least some fields of the application instance records to be updated by issuing updates 142 that identify the fields in the record to be updated and increments to or values to be added to the current values of the fields.

Figure 4F:
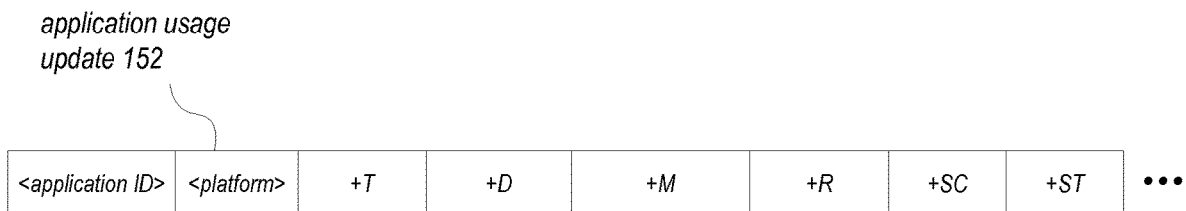
FIG. 4F illustrates an example update for a record in an application usage table, according to some embodiments of a usage analysis system.

FIG. 4F illustrates an example update 152 for a record in an application usage 150 table as illustrated in FIG. 4D, according to some embodiments of a usage analysis system 100. In some embodiments, each application usage update 152 may include an application ID that uniquely identifies a particular application being monitored by the usage analysis system 130. In some embodiments the application ID in an update 152 may be used to locate a respective record in the application usage 150 table. In some embodiments, each application usage update 152 may also include a platform identifier that identifies a particular platform (e.g., particular mobile device platform) for which the respective application is supported. In these embodiments, the application usage 150 table may include a row for each application/platform combination, and the usage analysis system 130 may use a combination of the application ID and platform ID as a key to locate the respective record in table 150.

In some embodiments, the storage or DB service and APIs used by the usage analysis system 100 to store the application usage 150 table may allow values in fields of the records to be updated by issuing updates that identify the fields in the record to be updated and values to be added to the current values of the fields. In some embodiments, an application usage update 152 may include one or more fields each indicating an increment for or value to be added to a particular aggregated usage metric of this particular application or application/platform. For example, in some embodiments, an application usage record may include a total devices metric that indicates a total number of unique application instances that have been recorded for this application, and an application usage update 152 may indicate a value T to be added to the total devices metric. As another example, in some embodiments, an application usage record may include a daily active devices (DAD) metric that tracks how many devices (application instances) have recorded at least one session on a given day, and an application usage update 152 may indicate a value D to be added to the DAD metric. As another example, in some embodiments, an application usage record may include a monthly active devices (MAD) metric that tracks how many devices (application instances) have recorded at least one session within a given month (e.g., within a rolling 30-day period), and an application usage update 152 may indicate a value M to be added to the MAD metric. As another example, in some embodiments, an application usage record may include a session count metric indicating a total number of sessions for this application across all application instances and a session time metric indicating a total amount of session time logged for this application across all application instances, and an application usage update 152 may indicate a value SC to be added to the session count metric and a value ST to be added to the session time metric. As another example, in some embodiments, an application usage record may include one or more retention metrics for the application, and an application usage update 152 may indicate one or more values R to be added to respective retention metrics.

Partitioned Batch Processing in a Usage Analysis System

Figure 11:
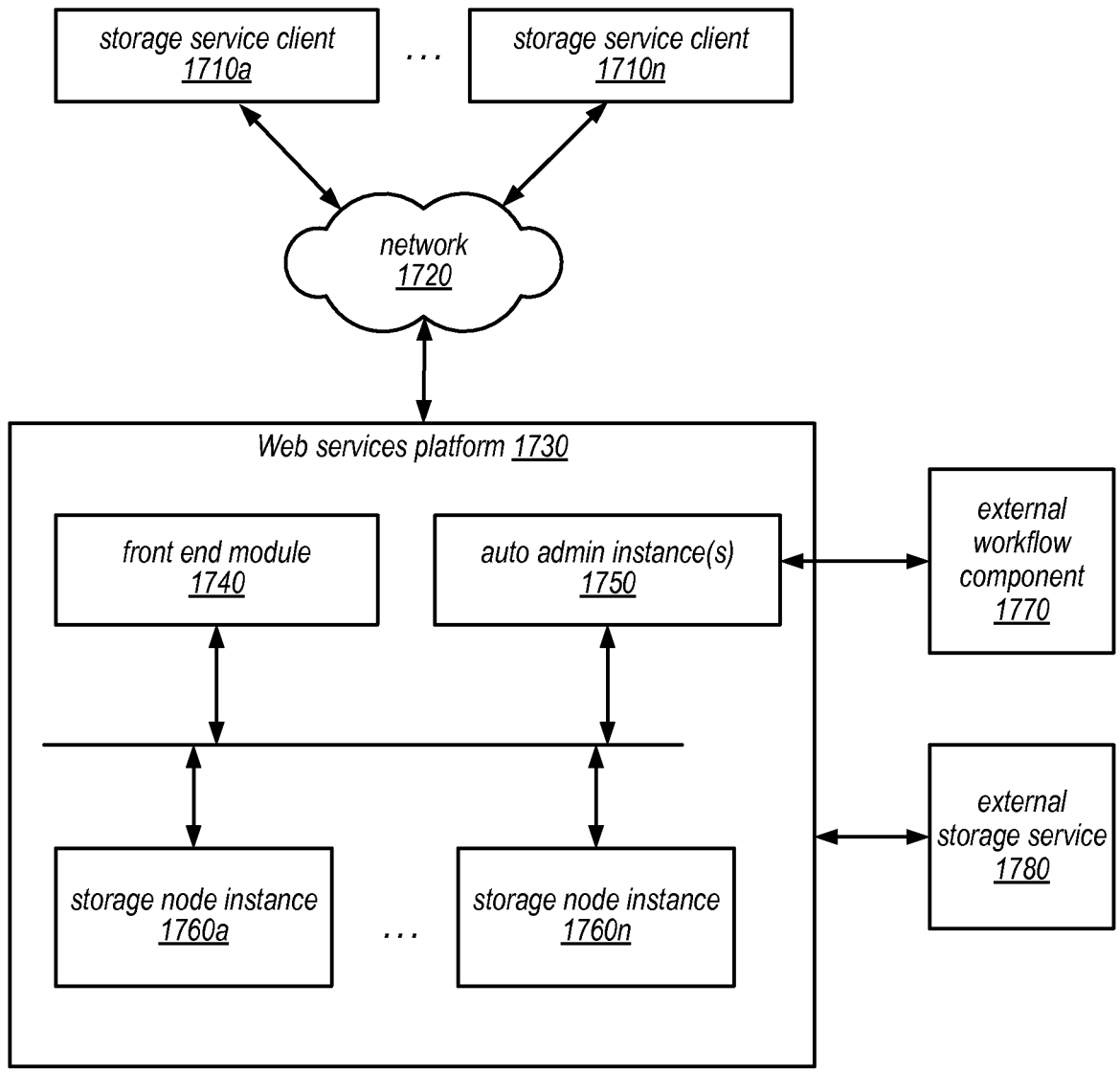
FIG. 11 is a block diagram illustrating a web services-based database service that may be used in at least some embodiments of a usage analysis system.

A goal of a usage analysis system 100 as illustrated in FIG. 1 may be to provide real-time or near-real-time usage information 174 to the usage information consumer(s) 170. In a usage analysis system 100, a given application 182 may be instantiated on anywhere from tens, hundreds, to millions of devices 180, and a given device 180 may include instances of many different applications 182. The instances of a single application 182 may generate millions of session events in a day, and may at times generate hundreds or thousands of events a second. Collectively, the applications 182 being monitored in the usage analysis system 100 may generate many millions or even billions of session events daily. Processing the session event data into the application instances 140 table and processing the application usage updates generated for the session events into the application usage 150 table may thus be very expensive in terms of computation, bandwidth, and storage resources, and may in some cases overwhelm the throughput capacity of one or more components of the usage analysis service. For example, in some embodiments, the storage system (e.g., a database service as illustrated in FIG. 11) used by the usage analysis service 130 for storing the tables 140 and 150 may store data into storage partitions, and may limit how many writes can be made per second to a given storage partition. In some implementations, a few applications 182 being monitored may generate most of the usage analysis traffic, and at times may generate hundreds or thousands of events per second, and thus may in some cases dominate or "brown out" one or more storage partitions, potentially causing latency in processing session events for other applications 182, and thus latency in providing usage information 174 to at least some consumers 170.

Figure 10:
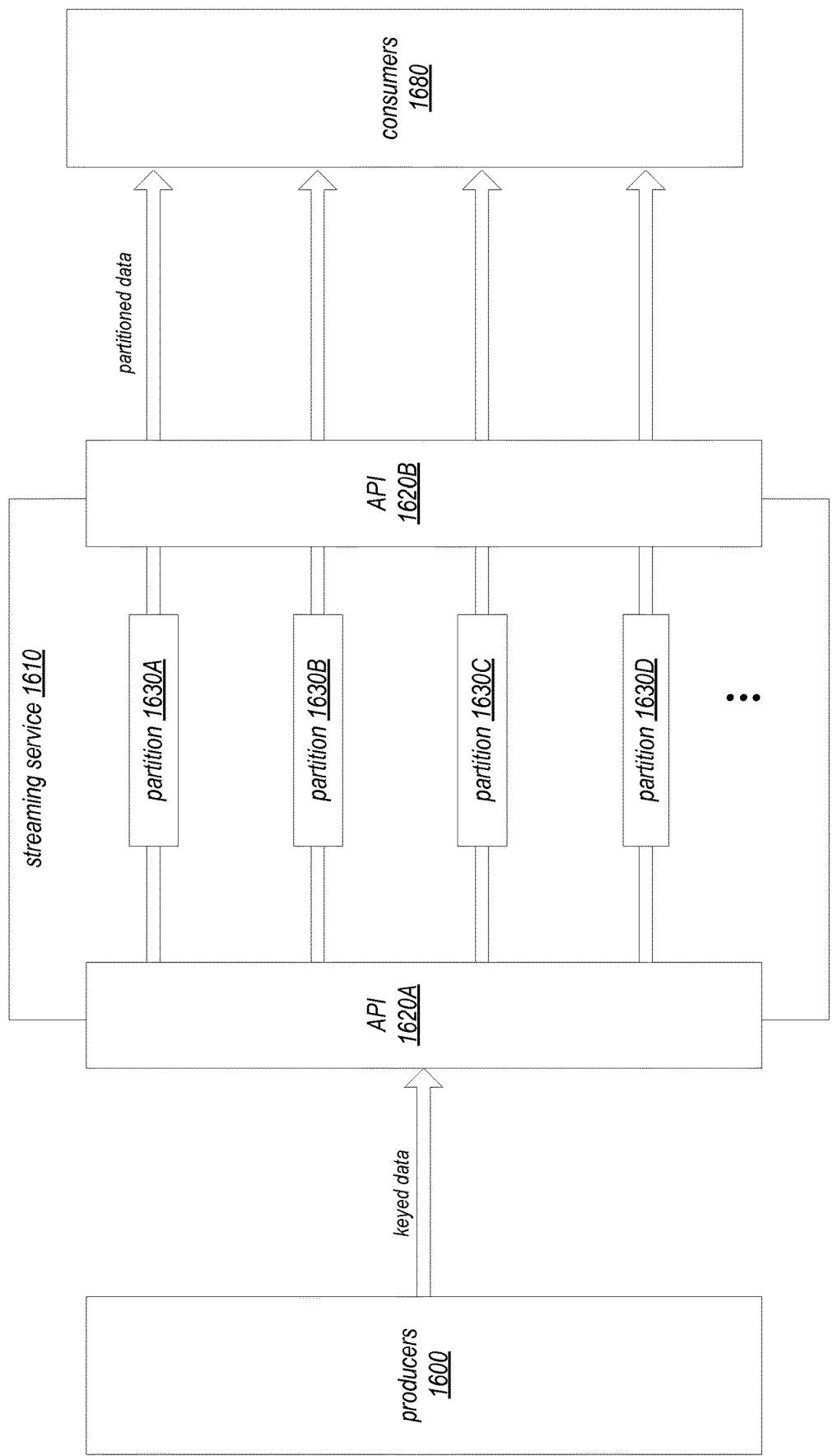
FIG. 10 illustrates an example streaming service that may be used to provide partitioned processing of application instance update data and/or application usage update data in at least some embodiments of a usage analysis system.

In some embodiments, to facilitate processing of the session event data into the application instances 140 table and/or the processing of the application usage updates into the application usage 150 table, the usage analysis service 130 may implement one or more methods for partitioning the data and for batch processing the partitioned data. Partitioning, as used herein, refers to separating input data records into multiple groups or partitions according to one or more keys, and storing or streaming the data according to the partitions. The partitioned data may then be separately processed or consumed by different nodes or threads of the usage analysis service 130. In addition, embodiments may decouple the session event processing 132 component from the application usage update processing 134 component, allowing these components of the usage analysis service 130 to scale independently of each other. In some embodiments, the usage analysis service 130 may leverage an ordered streaming service that provides key-based partitioning and ordered processing of data in streams to implement the partitioning, storing, and streaming of data records, and to facilitate decoupling of the session event processing 132 component from the application usage update processing 134 component. FIG. 10 illustrates an example ordered streaming service that may be used in some embodiments.

FIGS. 2A, 2B, 3, 5A, 5B, and 6 illustrate methods for processing received session events to generate updates for and apply updates to the application instance table and application usage table that may be implemented in at least some embodiments of a usage analysis service 100 as illustrated in FIG. 1.

Partitioning and Processing Application Usage Updates

Figure 5A:
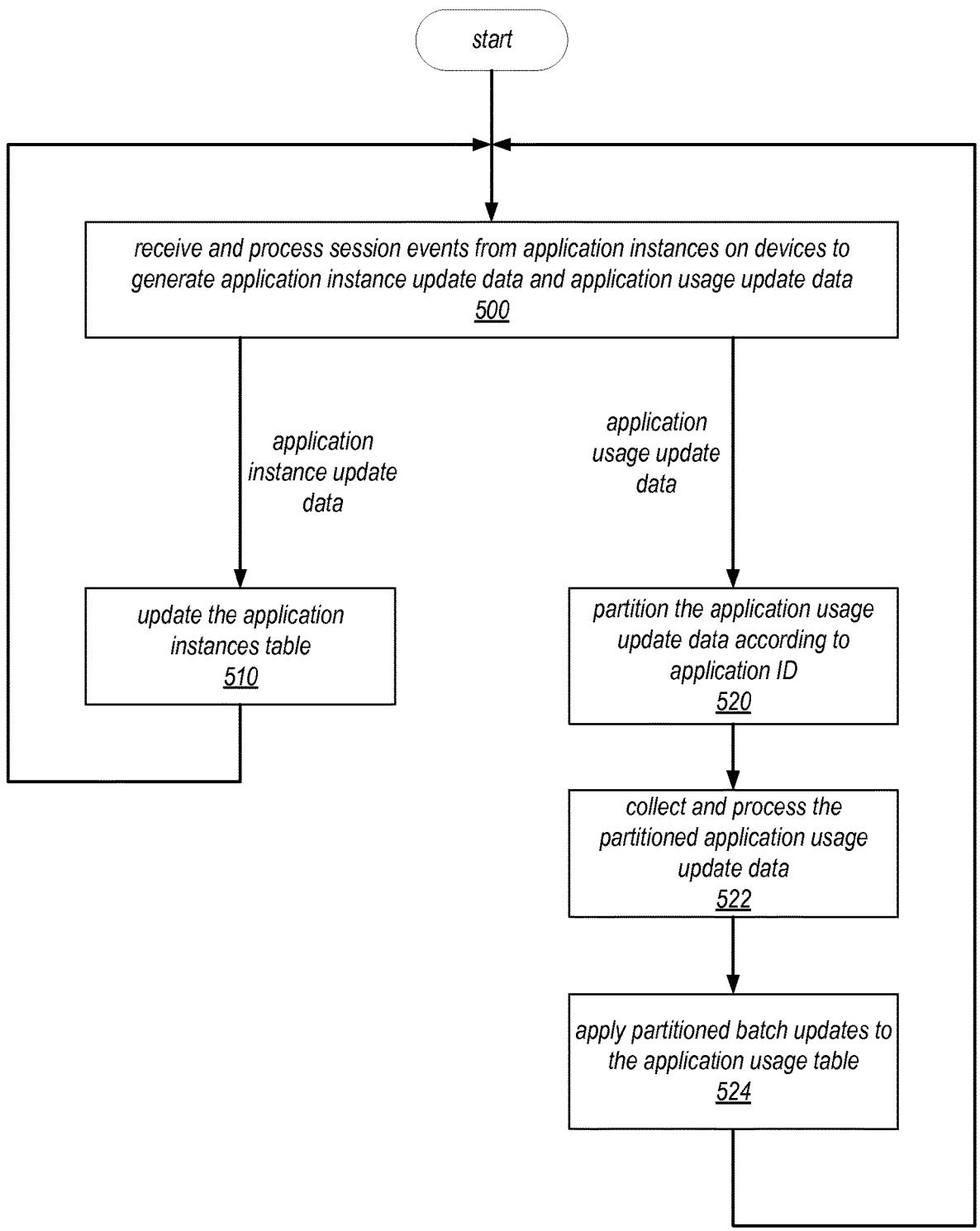
FIG. 5A is a flowchart of a method for partitioning and batching application usage update data for updating records in an application usage table of a usage analysis system, according to at least some embodiments.
Figure 5B:
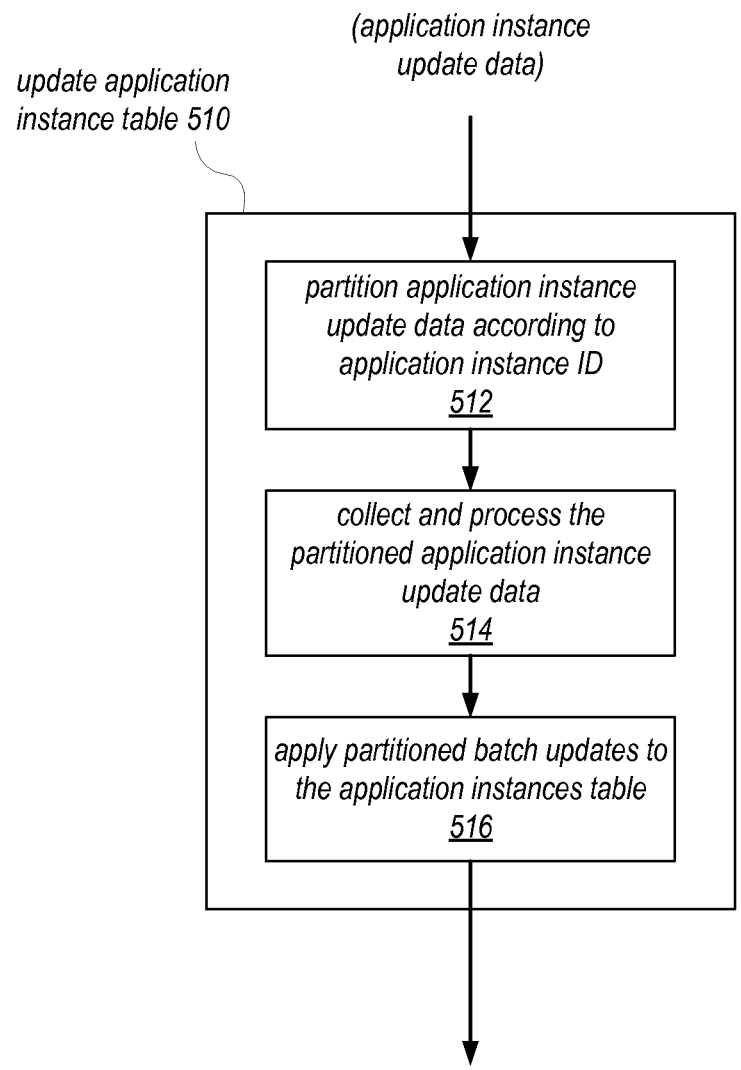
FIG. 5B is a flowchart of a method for partitioning and batching application instance update data for updating records in an application instance table of a usage analysis system, according to at least some embodiments.

FIG. 5A is a flowchart of a method for processing session events that may be implemented in at least some embodiments of a usage analysis service 100 as illustrated in FIG. 1. The method of FIG. 5A includes a method for partitioning and processing application usage update data, according to some embodiments. As indicated at 500 of FIG. 5A, the usage analysis service may receive and process session events from application instances on a plurality of devices to generate application instance update data and application usage update data. As indicated at 510 of FIG. 5A, the usage analysis service updates the application instance table according to the application instance update data. FIG. 5B shows a method for updating an application instance table according to the application instance update data that may be used in some embodiments of a usage analysis system.

Elements 520, 522, and 524 of FIG. 5A illustrate a method for partitioning and processing application usage update data in a usage analysis system 100, according to some embodiments.

As indicated at 520 of FIG. 5A, the application usage update data may be partitioned according to the application ID. In some embodiments in which supported platforms are tracked, the application usage update data may be partitioned according to a combination of the application ID and a platform ID. As indicated at 522 of FIG. 5A, the partitioned application usage update data may be collected and processed. For example, in some embodiments, batches of the partitioned application usage update data may be collected into memory buffers for a period (e.g., 10 seconds, 30 seconds, 60 seconds, etc), each buffer corresponding to a respective application or application/platform combination, and one or more processing functions may be applied to the application usage update data. For example, in some embodiments, a batch of application usage update data for an application usage table record may include multiple (dozens, hundreds, or even thousands) of individual application usage update data records, with each application usage update data record including increments (e.g., +1) for one or more of the aggregated usage metrics of the respective application. In some embodiments, the usage analysis service may process the application usage update data records in the batch to combine the individual application usage update data records into one or a few application usage update records. Thus, multiple application usage update data records may be combined to form a single application usage update, with the increments from the individual application usage update records summed in the application usage update so that the increments can be applied to the application usage table record in one update operation rather than in multiple individual update operations. For example, instead of applying a +1 increment to a particular aggregated usage metric 500 times, the usage analysis service may apply a single +500 increment to the aggregated usage metric.

As indicated at 524 of FIG. 5A, the usage analysis service may apply the partitioned and processed batches of application usage updates to the application usage table. In some embodiments, for example, one or more batch processing nodes of the usage analysis service may periodically or aperiodically read respective batches of application usage updates from the buffers (or in some embodiments a single combined application usage update) and apply the update(s) to respective records in the application usage table. In some embodiments, for example, element 524 may be performed at a specified time interval (referred to herein as a batch update interval), for example every 10 seconds, 30 seconds, 60 seconds, etc. In some embodiments, to apply the updates to the application usage table, the usage analysis service may send the updates to a storage or DB service (e.g., a database service as illustrated in FIG. 11) used for storing the application usage table, for example according to an API provided by the storage or DB service.

Figure 2A:
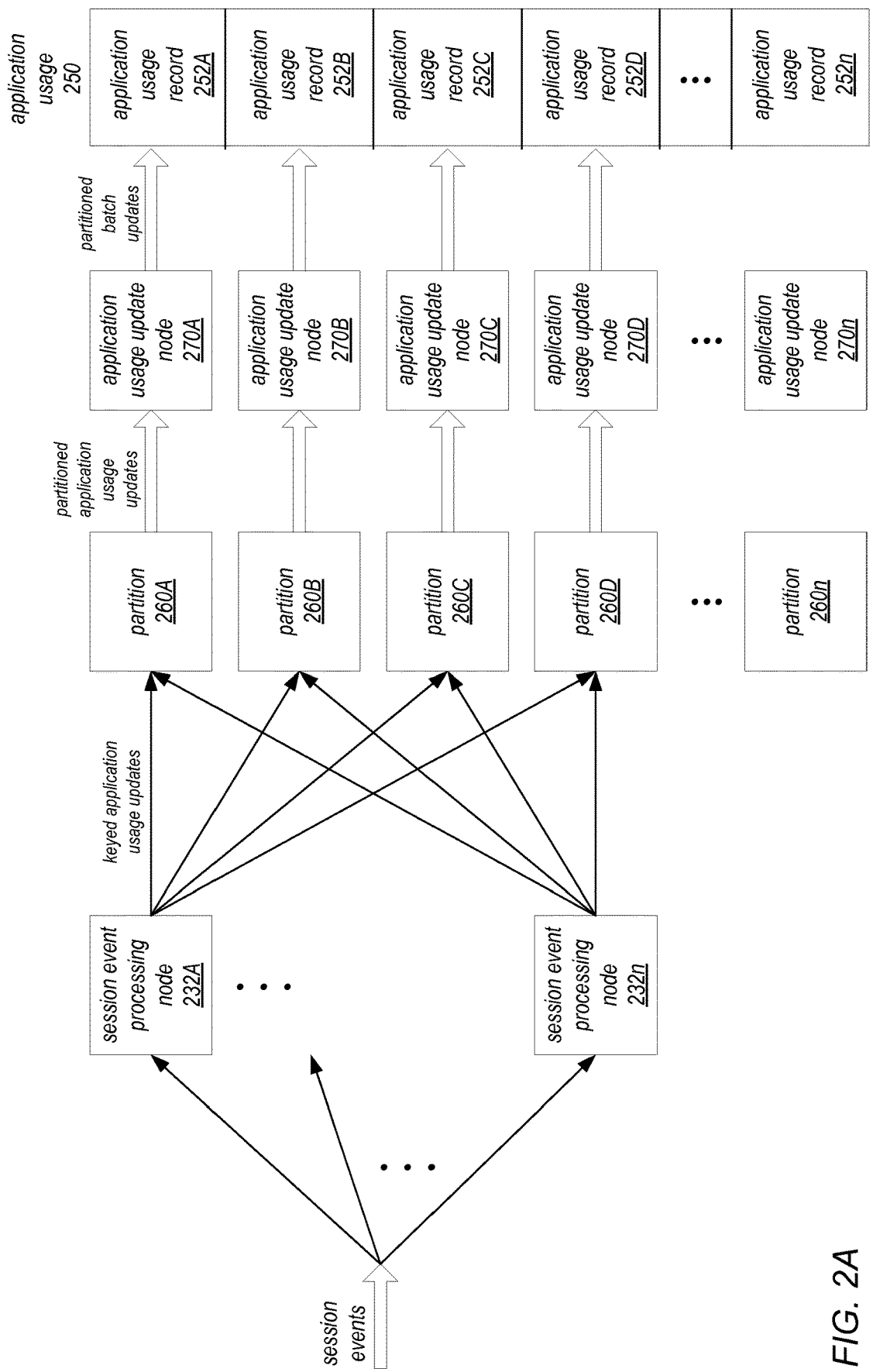
FIG. 2A is a block diagram illustrating a method for partitioning and processing application usage update data in a usage analysis system, according to at least some embodiments.

The elements of FIG. 5A are further illustrated with reference to FIG. 2A. FIG. 2A is a block diagram illustrating a method for partitioning and processing application usage update data in a usage analysis system, according to at least some embodiments.

As indicated at 500 of FIG. 5A, the usage analysis service may receive and process session events from application instances on a plurality of devices to generate application instance update data and application usage update data. Referring to FIG. 2A, session events for a plurality of applications may be received from application instances on a plurality of devices. In some embodiments, each application may be identified by a unique application identifier (application ID), and each device on which the application is instantiated may be identified by a unique device identifier (device ID). In some embodiments, the device ID and application ID may be included in the session events generated by the application instances on the devices. In some embodiments, the application instances and/or devices may each collect and periodically (e.g. once an hour, once a day, etc.) submit batches of the local session events to the usage analysis service. In some embodiments, an event recorder service (not shown) may receive the session events from the devices and distribute the session events to one or more session event processing nodes 232A-232n of the usage analysis service.

In some embodiments, each session event processing node 232 of the usage analysis service may receive and process session events received from one or more of the application instances to generate application instance update data and application usage update data. In some embodiments, the usage analysis service maintains an application usage 250 table (or tables) that includes a separate row or record 252 for each application (or application/platform combination) being monitored by the usage analysis service. Each application usage record 252 may include one or more aggregated usage metrics for the respective application or application/platform combination. When processing the session events to generate application instance update data for updating the application instances table, the usage analysis service generates application usage updates for the application usage records 252 in the application usage table 250.

As indicated at 520 of FIG. 5A, the application usage update data may be partitioned using the application ID as the partition key. In some embodiments in which supported platforms are tracked, the application usage update data may be partitioned using a combination of the application ID and a platform ID as the partition key. Referring to FIG. 2A, in some embodiments, to partition the application usage update data, each session event processing node 232 may send application usage update data records to respective partitions 260A-260n according to the partition key. Each partition 260A-260n corresponds to a particular application usage record 252A-252n in the application usage 250 table. In some embodiments, to partition the application usage update data, the usage analysis service may send the application usage update data records to an ordered streaming service that provides key-based partitioning and ordered processing of data in streams. The streaming service may provide an API via which the session event processing nodes 232 may send the application usage update data records to the streaming service, indicating the field(s) of the records to be used as the partition key. The streaming service may then write or store the application usage update data records to the respective partitions 260A-260n according to the partition key.

As indicated at 522 of FIG. 5A, the partitioned application usage update data may be collected into batches in memory buffers. Referring to FIG. 2A, in some embodiments, each partition 260A-260n may be implemented as a memory buffer. For example, in some embodiments, the ordered streaming service used by the usage analysis service may allocate the partitions 260A-260n as memory buffers. In some embodiments, the batches of partitioned application usage update data may be collected into the partitions 260A-260n for a period (e.g., 10 seconds, 30 seconds, 60 seconds, etc), each partition 260A-260n corresponding to a respective partition key (e.g., application ID or application ID/platform ID combination). Each batch may include dozens, hundreds, or even thousands of application usage update data records for the respective partition key.

As indicated at 522 and 524 of FIG. 5A, the batches of application usage update data records may be processed, and the partitioned and processed batches of application usage updates may be applied to the application usage table. Referring to FIG. 2A, in some embodiments, the usage analysis service may implement one or more application usage update nodes 270 that process and apply the batches of application usage updates from the partitions 260. In some embodiments, the usage analysis service may implement one application usage update node 270 for each partition 260 and corresponding application usage record 252. Thus, in some embodiments, the partitions 260A-260n correspond to application usage records 252A-252n in the application usage 250 table, with application usage update nodes 270A-270n processing data from respective partitions 260A-260n into respective application usage records 252A-252n in the application usage 250 table. In some embodiments, the application usage update nodes 270A-270n may apply batches of updates from respective partitions 260A-260n to the respective application usage records 252A-252n according to a specified schedule (for example, according to a specified batch update interval), for example every 10 seconds, 30 seconds, 60 seconds, etc. In some embodiments, to apply the updates to the respective application usage records 252A-252n in the application usage table 250, the application usage update nodes 270A-270n may send the updates to a storage or DB service (e.g., a database service as illustrated in FIG. 11) used for storing the application usage table 250, for example according to an API provided by the storage or DB service.

By partitioning the application usage updates, collecting and processing the updates, and periodically applying the batches of partitioned and processed application usage updates to the application usage table as illustrated in FIGS. 2A and 5A, embodiments of the usage analysis service may greatly reduce the input load on the application usage table 250. For example, assuming that there are 10000 ($10k$) incoming session events to the usage analysis service per second, the $10k$ events may generate $10k$ separate updates to the records in the application usage table 250 per second. Assuming the batches are applied every 10 seconds, by partitioning, collecting, processing, and periodically applying the batches of partitioned and processed updates as illustrated in FIGS. 2A and 5A, embodiments may reduce the number of updates to the application usage table 250 from $10k$ per second to one update per application usage record 252 every 10 seconds.

Partitioning and Processing Application Instance Updates

FIG. 5B is a flowchart of a method for partitioning and processing application instance update data for updating records in an application instance table of a usage analysis system, according to at least some embodiments. Referring to FIG. 5A, at 500, the usage analysis service may receive and process session events from application instances on a plurality of devices to generate application instance update data and application usage update data, and at 510, the usage analysis service updates the application instance table according to the application instance update data. In some embodiments, the method of FIG. 5B may be performed at element 510 of FIG. 5A to update the application instance table.

As indicated at 512 of FIG. 5B, the usage analysis service may partition the application instance update data according to the unique application instance ID. In some embodiments, a combination or concatenation of the device ID and the application ID included in the session events may form an application instance ID that uniquely identifies a particular application instance on a particular device within the usage analysis system. However, in some embodiments, other methods may be used to provide unique application instance IDs.

As indicated at 514 of FIG. 5B, the usage analysis service may collect the partitioned application instance update data. For example, in some embodiments, batches of the partitioned application instance update data may be collected into memory buffers for a period (e.g., 10 seconds, 30 seconds, 60 seconds, etc), each buffer corresponding to a respective application instance. As indicated at 514 of FIG. 5B, in some embodiments, the usage analysis service may process the partitioned and collected application instance data. For example, in some embodiments, the usage analysis service may process the application instance update data in the batches to combine two or more individual application instance update records into a single application instance update record. For example, if a batch of application instance update records includes N update records each indicating a unique session and a duration for the respective session, the usage analysis service may combine the N records into a single update record that indicates an increment of N for a session count metric of the respective application instance record, and a sum of the durations of the N sessions to be added to a total session time metric of the respective application instance record. Thus, instead of applying N separate updates to the application instance record, a single update may be applied, which reduces input load on the application instances table.

As indicated at 516 of FIG. 5B, the usage analysis service may apply batch updates to the application instance records in the application instances table according to the partitioned application instance update data. In some embodiments, for example, one or more batch processing nodes of the usage analysis service may periodically or aperiodically read respective batches of application instance updates from the buffers and apply the updates to respective application instance records in the application instances table. In some embodiments, for example, element 516 may be performed at a specified time interval (referred to herein as a batch update interval), for example every 10 seconds, 30 seconds, 60 seconds, etc. In some embodiments, to apply the updates to the application instances table, the usage analysis service may send the updates to a storage or DB service (e.g., a database service as illustrated in FIG. 11) used for storing the application instances table, for example according to an API provided by the storage or DB service.

Figure 2B:
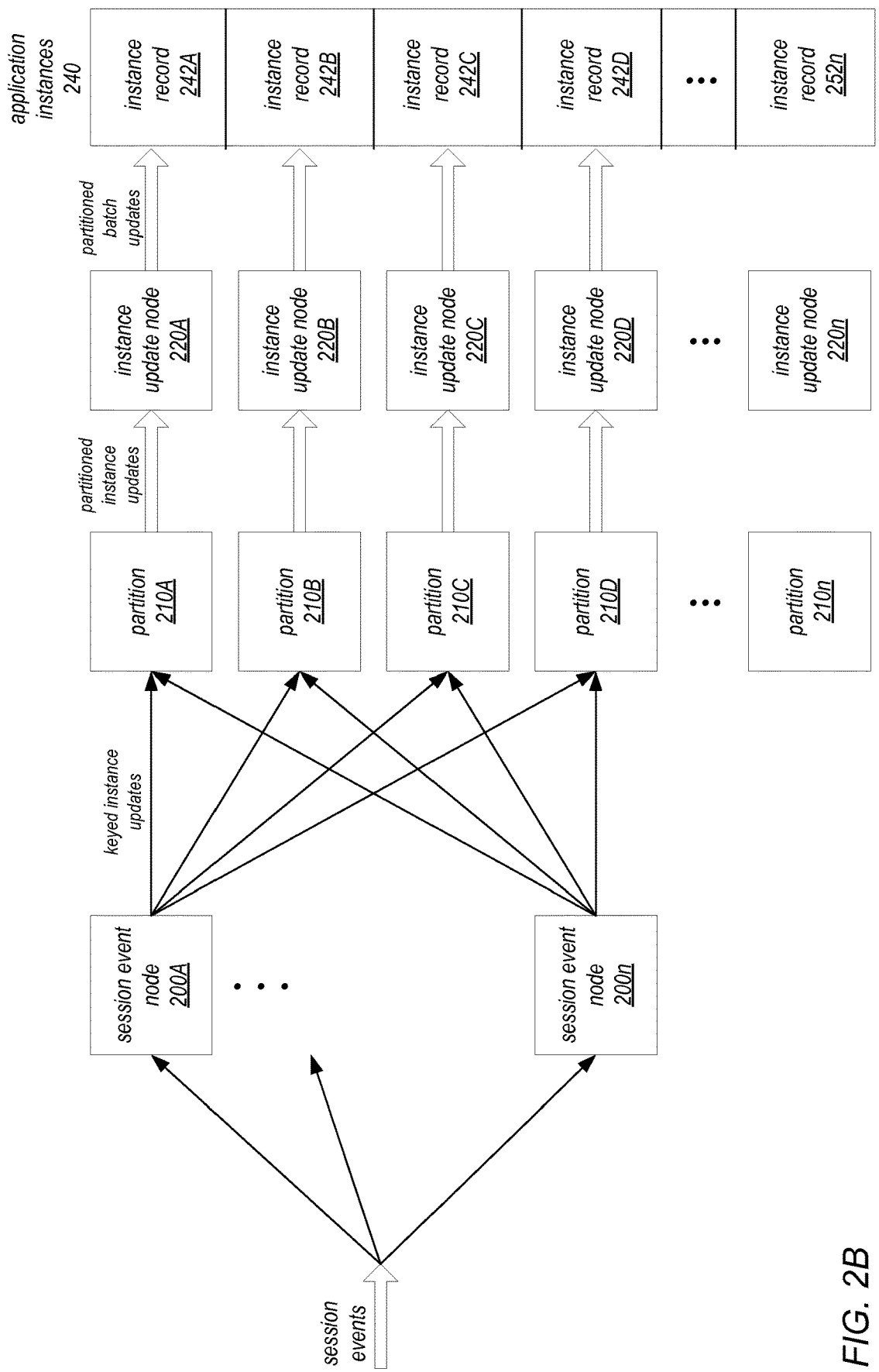
FIG. 2B is a block diagram illustrating a method for partitioning and processing instance update data in a usage analysis system, according to at least some embodiments.

The elements of FIG. 5B are further illustrated with reference to FIG. 2B. FIG. 2B is a block diagram illustrating a method for partitioning and processing application instance update data in a usage analysis system, according to at least some embodiments.

As indicated at 500 of FIG. 5A, the usage analysis service may receive and process session events from application instances on a plurality of devices to generate application instance update data and application usage update data. Referring to FIG. 2B, session events for a plurality of applications may be received from application instances on a plurality of devices. In some embodiments, each application may be identified by a unique application identifier (application ID), and each device on which the application is instantiated may be identified by a unique device identifier (device ID). In some embodiments, the device ID and application ID may be included in the session events generated by the application instances on the devices. In some embodiments, the application instances and/or devices may each collect and periodically (e.g. once an hour, once a day, etc.) submit batches of the local session events to the usage analysis service. In some embodiments, an event recorder service (not shown) may receive the session events from the devices and distribute the session events to one or more session event nodes 200A-200n of the usage analysis service.

In some embodiments, each session event node 200 of the usage analysis service may receive and process session events received from one or more of the application instances to generate application instance update data and application usage update data. In some embodiments, the usage analysis service maintains an application instances 240 table (or tables) that includes a separate row or record 242 for each known unique application instance. Each application instance record 242 may include one or more application instance usage metrics for the respective application instance. When processing the session events, the usage analysis service generates application instance update data for updating the application instance records 242 in the application instances table 240.

As indicated at 512 of FIG. 4B, the usage analysis service may partition the application instance update data according to the unique application instance ID. Referring to FIG. 2B, in some embodiments, to partition the instance update data, each session event node 200 may send its instance update data records to respective partitions 210A-210n using the application instance ID as the partition key. Each partition 210A-210n corresponds to a particular instance record 242A-242n in the application instances 240 table. In some embodiments, to partition the instance update data, the usage analysis service may send the instance update data records to an ordered streaming service that provides key-based partitioning and ordered processing of data in streams. The streaming service may provide an API via which the session event nodes 200 may send the instance update data records to the streaming service, indicating the field(s) of the records to be used as the partition key. The streaming service may then write or store the instance update data records to the respective partitions 210A-210n according to the partition key.

As indicated at 514 of FIG. 5B, the partitioned instance update data may be collected into batches in memory buffers. Referring to FIG. 2B, in some embodiments, each partition 210A-210n may be implemented as a memory buffer. For example, in some embodiments, the ordered streaming service used by the usage analysis service may allocate the partitions 210A-210n as memory buffers. In some embodiments, the batches of partitioned instance update data may be collected into the partitions 210A-210n for a period (e.g., 10 seconds, 30 seconds, 60 seconds, etc), each partition 210A-210n corresponding to a respective application instance.

As indicated at 514 and 516 of FIG. 5B, the batches of instance updates may be processed and applied to the application instances table. Referring to FIG. 2B, in some embodiments, the usage analysis service may implement one or more instance update nodes 220 that process and apply the batches of instance updates from the partitions 210. In some embodiments, the usage analysis service may implement one instance update node 220 for each partition 210 and corresponding instance record 242. Thus, in some embodiments, the partitions 210A-210n correspond to instance records 242A-242n in the application instances 240 table, with instance update nodes 220A-220n processing data from respective partitions 210A-210n into respective instance records 242A-242n in the application instances 240 table. In some embodiments, the instance update nodes 220A-220n may apply batches of updates from respective partitions 210A-210n to the respective instance records 242A-242n according to a specified schedule (for example, according to a batch update interval), for example every 10 seconds, 30 seconds, 60 seconds, etc. In some embodiments, to apply the updates to the respective instance records 242A-242n in the application instances table 240, the instance update nodes 220A-220n may send the updates to a storage or DB service (e.g., a database service as illustrated in FIG. 11) used for storing the application instances table 240, for example according to an API provided by the storage or DB service.

Partitioned Processing of Application Instance Data and Application Aggregated Usage Data FIGS. 2A and 5A illustrate partitioning and processing application usage update data. FIGS. 2B and 5B illustrate partitioning and processing application instance data. In some embodiments of a usage analysis system, session events are partitioned and processed to generate partitioned application instance updates and application usage updates; the application usage updates are then partitioned and processed to update the application usage records in the application usage table. In some embodiments, for example, referring to FIGS. 2A and 2B, the instance update nodes 220 shown in FIG. 2B may correspond to the session event processing nodes 232 shown in FIG. 2A. Thus, in addition to generating updates for the instance records 242 in the application instances table 240 as shown in FIG. 2B, the instance update nodes 220 may also generate and distribute the application usage updates to the partitions 260 as shown in FIG. 2A.

Figure 6:
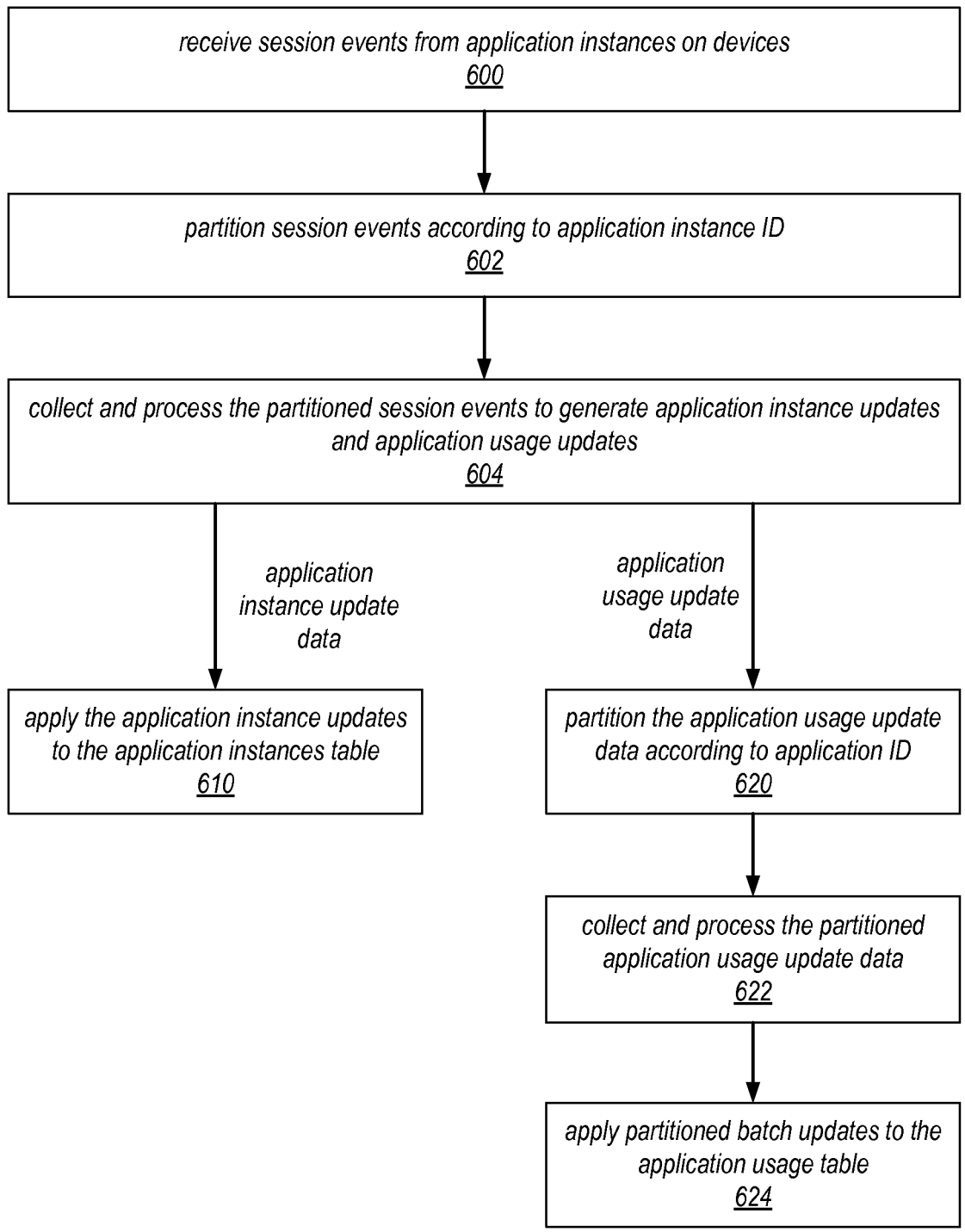
FIG. 6 is a flowchart of a method for partitioning and processing instance update data and application usage update data in a usage analysis system, according to some embodiments.

FIG. 6 is a flowchart of a method for partitioning and processing instance update data and application usage update data in a usage analysis system, according to some embodiments. As indicated at 600 of FIG. 6, the usage analysis service may receive session events from application instances on devices. Each session event may include a unique application instance identifier (ID). In some embodiments, a combination or concatenation of a unique device ID and a unique application ID included in the session events may form the application instance ID that uniquely identifies a particular application instance on a particular device within the usage analysis system. As indicated at 602 of FIG. 6, the usage analysis service may partition the session events according to the unique application instance ID. As indicated at 604 of FIG. 6, the usage analysis service may collect and process the partitioned session events to generate application instance updates and application usage updates. In some embodiments, each application instance update may include a respective application instance ID, and each application usage update may include a respective application ID. As indicated at 610, the partitioned application instance updates may be applied to the records in the application instances table. In some embodiments, the partitioned application instance updates may be collected into batches in buffers, for example for a batch update interval, and the usage analysis service may apply batch updates to the application instance records in the application instances table according to the partitioned and batched application instance update data. In some embodiments, for example, one or more batch processing nodes of the usage analysis service may periodically or aperiodically read respective batches of application instance updates from the buffers and apply the updates to respective application instance records in the application instances table.

At 620 through 624 of FIG. 6, the application usage updates generated at 604 may be partitioned, processed, and applied to the records in the application usage table. As indicated at 620 of FIG. 6, the application usage update data may be partitioned according to the application ID. In some embodiments in which supported platforms are tracked, the application usage update data may be partitioned according to a combination of the application ID and a platform ID.

As indicated at 622 of FIG. 6, the partitioned application usage update data may be collected and processed. For example, in some embodiments, batches of the partitioned application usage update data may be collected into memory buffers for a period, each buffer corresponding to a respective application or application/platform combination, and one or more processing functions may be applied to the application usage update data. For example, in some embodiments, a batch of application usage update data for an application usage table record may include multiple (dozens, hundreds, or even thousands) of individual application usage update data records, with each application usage update data record including increments (e.g., +1) for one or more of the aggregated usage metrics of the respective application. In some embodiments, the usage analysis service may process the application usage update data records in the batch to combine the individual application usage update data records into one or a few application usage update records. Thus, multiple application usage update data records may be combined to form a single application usage update, with the increments from the individual application usage update records summed in the application usage update so that the increments can be applied to the application usage table record in one update operation rather than in multiple individual update operations.

As indicated at 624 of FIG. 6, the usage analysis service may apply the partitioned and processed batches of application usage updates to the application usage table. In some embodiments, for example, one or more batch processing nodes of the usage analysis service may periodically or aperiodically read respective batches of application usage updates from the buffers (or in some embodiments a single combined application usage update) and apply the update(s) to respective records in the application usage table.

Figure 3:
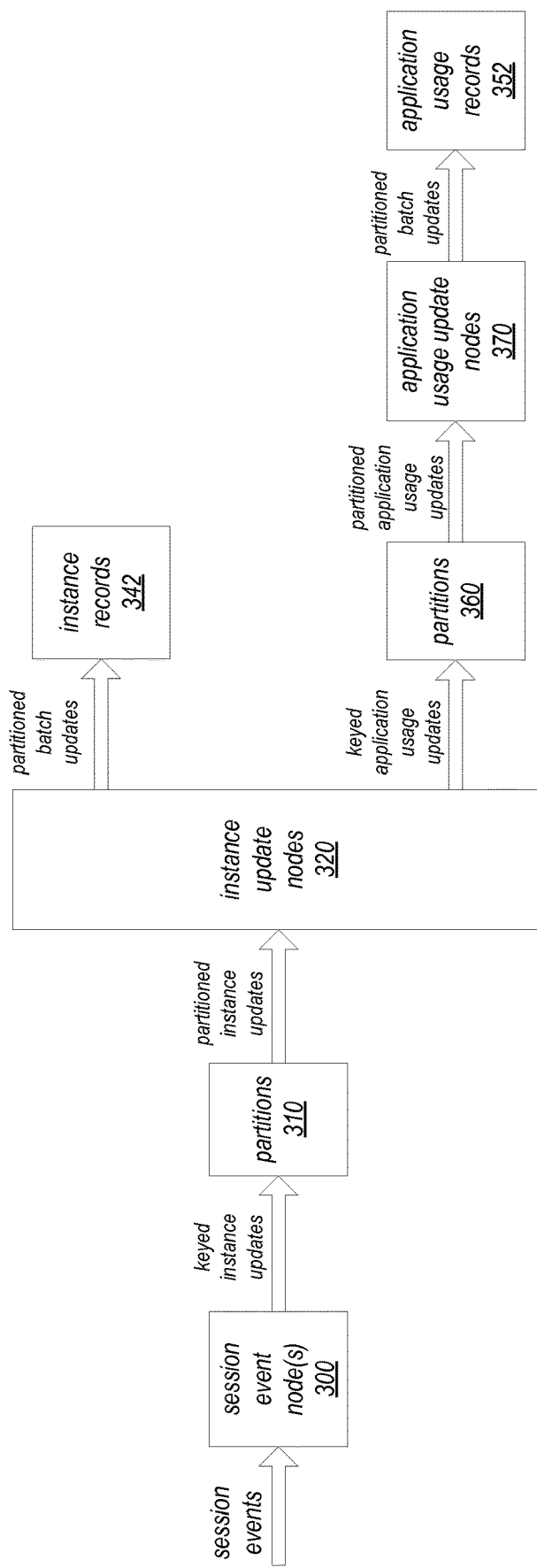
FIG. 3 is a block diagram illustrating a method for partitioning and processing instance update data and application usage update data in a usage analysis system, according to some embodiments.

The method as illustrated in FIG. 6 is further illustrated with reference to FIG. 3. FIG. 3 is a block diagram illustrating a method for partitioning and processing instance update data and application usage update data in a usage analysis system, according to some embodiments; note that each session event may correspond to an application instance update.

As illustrated in FIG. 3, a usage analysis service may receive and process session events from application instances on a plurality of devices to generate application instance update data and application usage update data. Session events for a plurality of applications may be received from application instances on a plurality of devices. In some embodiments, each application may be identified by a unique application identifier (application ID), and each device on which the application is instantiated may be identified by a unique device identifier (device ID). In some embodiments, the device ID and application ID may be included in the session events generated by the application instances on the devices. In some embodiments, the application instances and/or devices may each collect and periodically submit batches of the local session events to the usage analysis service.

In some embodiments, one or more session event nodes 300 of the usage analysis service may receive the session events from the devices and partition the session events according to the unique application instance ID. In some embodiments, to partition the session events, each session event node 300 may send its session event data to respective ones of multiple partitions 310 using the application instance ID as the partition key. In some embodiments, each partition 310 corresponds to a particular instance record 342 in an application instances table. In some embodiments, to partition the session events, the session event node(s) 300 may send the session events to an ordered streaming service that provides key-based partitioning and ordered processing of data in streams. The streaming service may provide an API via which the session event nodes 300 may send the session events to the streaming service, indicating the field(s) of the session event records to be used as the partition key. The streaming service may then write or store the instance update data records to the respective partitions 310 according to the partition key. In some embodiments, each partition 310 may be implemented as a memory buffer. For example, in some embodiments, the ordered streaming service used by the usage analysis service may allocate the partitions 310 as memory buffers. In some embodiments, the batches of partitioned instance update data may be collected into the partitions 310 for a period, each partition 310 corresponding to a respective application instance.

In some embodiments, the usage analysis service may implement one or more instance update nodes 320 that process and apply the batches of instance updates from the partitions 310. In some embodiments, the usage analysis service may implement one instance update node 320 for each partition 310 and corresponding instance record 342. Thus, in some embodiments, the partitions 310 may correspond to instance records 342 in the application instances table, with instance update nodes 320 processing data from respective partitions 21 into respective instance records 342 in the application instances table. In some embodiments, the instance update nodes 320 may apply batches of updates from respective partitions 312 to the respective instance records 342 according to a batch update interval, for example every 10 seconds, 30 seconds, 60 seconds, etc. In some embodiments, to apply the updates to the respective instance records 342 in the application instances table, the instance update nodes 320 may send the updates to a storage or DB service (e.g., a database service as illustrated in FIG. 11) used for storing the application instances table, for example according to an API provided by the storage or DB service.

In some embodiments, the instance update nodes 320 may process the partitioned and collected application instance data. For example, in some embodiments, the instance update nodes 320 may process the application instance update data in batches to combine two or more individual application instance update records into a single application instance update record.

In some embodiments, each session event node 320 may generate application usage update data from the application instance updates and the application instance records 342. In some embodiments, the usage analysis service maintains an application usage table that includes a separate row or record 352 for each application (or application/platform combination) being monitored by the usage analysis service. Each application usage record 352 may include one or more aggregated usage metrics for the respective application or application/platform combination. When processing the partitioned session events to generate application instance update data for updating the records 342 in the application instances table, the session event nodes 320 also application usage updates for the application usage records 352 in the application usage table.

As indicated at 620 of FIG. 6, in some embodiments, the usage analysis service may partition the application usage update data using the application ID as the partition key. In some embodiments in which supported platforms are tracked, the application usage update data may be partitioned using a combination of the application ID and a platform ID as the partition key. Referring to FIG. 3, in some embodiments, to partition the application usage update data, each session event node 320 may send application usage update data records to respective ones of multiple partitions 360 according to the partition key. Each partition 360 corresponds to a particular application usage record 352 in the application usage table. In some embodiments, to partition the application usage update data, the session event nodes 320 may send the application usage update data records to an ordered streaming service that provides key-based partitioning and ordered processing of data in streams. The streaming service may provide an API via which the session event nodes 320 may send the application usage update data records to the streaming service, indicating the field(s) of the records to be used as the partition key. The streaming service may then write or store the application usage update data records to the respective partitions 360 according to the partition key.

As indicated at 622 of FIG. 6, the partitioned application usage update data may be collected into batches in memory buffers. Referring to FIG. 3, in some embodiments, each partition 360 may be implemented as a memory buffer. For example, in some embodiments, the ordered streaming service used by the usage analysis service may allocate the partitions 360 as memory buffers. In some embodiments, the batches of partitioned application usage update data may be collected into the partitions 360 for a period, each partition 360 corresponding to a respective partition key (e.g., application ID or application ID/platform ID combination). Each batch may include dozens, hundreds, or even thousands of application usage update data records for the respective partition key.

As indicated at 622 and 624 of FIG. 6, the batches of application usage update data records may be processed, and the partitioned and processed batches of application usage updates may be applied to the application usage table. Referring to FIG. 3, in some embodiments, the usage analysis service may implement one or more application usage update nodes 370 that process and apply the batches of application usage updates from the partitions 360. In some embodiments, the usage analysis service may implement one application usage update node 370 for each partition 360 and corresponding application usage record 352. Thus, in some embodiments, the partitions 360 correspond to application usage records 252 in the application usage table, with application usage update nodes 370 processing data from respective partitions 360 into respective application usage records 352 in the application usage table. In some embodiments, the application usage update nodes 370 may apply batches of updates from respective partitions 360 to the respective application usage records 352 according to a batch update interval, for example every 10 seconds, 30 seconds, 60 seconds, etc. In some embodiments, to apply the updates to the respective application usage records 352 in the application usage table, the application usage update nodes 270A-270n may send the updates to a storage or DB service (e.g., a database service as illustrated in FIG. 11) used for storing the application usage table, for example according to an API provided by the storage or DB service.

Data Integrity Monitoring in a Usage Analysis System

Figure 7:
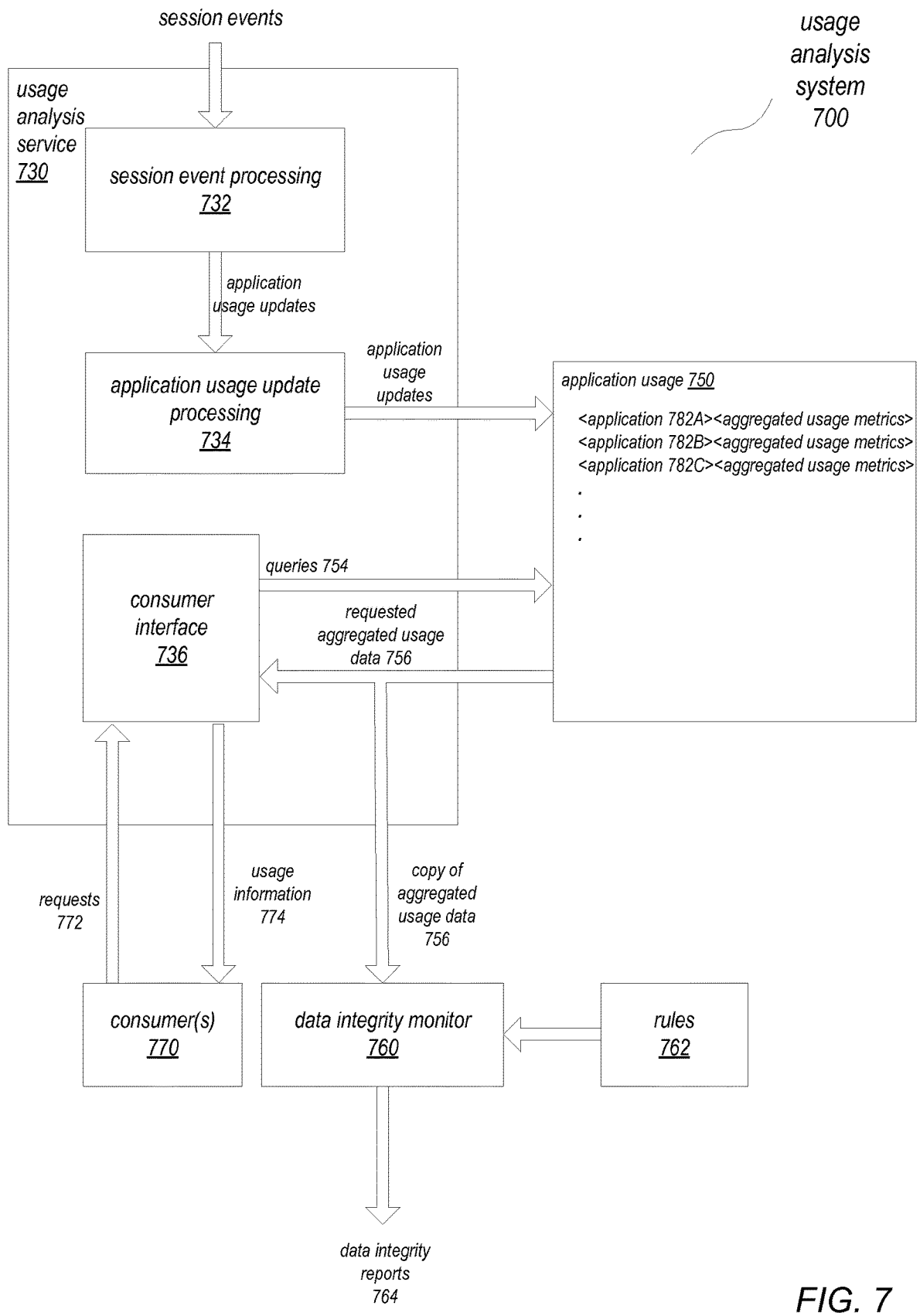
FIG. 7 illustrates an example data integrity monitor for a usage analysis system, according to at least some embodiments.

In some embodiments, a usage analysis system, for example a usage analysis system 100 as illustrated in FIGS. 1 through 6, may include or provide a data integrity monitor that implements a rules-based engine that applies rules to the aggregated usage metrics generated by the usage analysis system 100 to validate the integrity of the usage data. FIG. 7 illustrates an example data integrity monitor 760 for a usage analysis system 700, according to at least some embodiments. A usage analysis service 730 may include a session event processing 732 module, an application usage update processing 734 module, and a consumer interface 736. In some embodiments, the session event processing 732 module may receive and process session events to generate application usage updates for application usage records in an application usage table 750. The session event processing 732 module may provide the application usage updates to the application usage update processing 734 module. The application usage update processing 734 module may apply the application usage updates to respective application usage records in the application usage 150 table. FIG. 4D illustrates example application usage records that may be maintained in an application usage 750 table, and provides several examples of aggregated usage metrics that may be included in application usage records.

In some embodiments, the consumer interface 736 component of the usage analysis service 730 may provide one or more user interfaces (UIs) and/or application programming interfaces (APIs) via which consumer(s) 770 can generate requests 772 for usage information 774, and receive and view the requested usage information 774; the usage information may be generated from aggregated usage data 756 retrieved from application usage 750 table according to the requests 772. For example, consumer interface 736 may present a web page UI to consumer(s) 770 via web browsers on computing devices; a consumer 770 may request 772 and receive usage information 774 for a particular application 782 as textual and/or graphical data via the web page UI.

In some embodiments, the usage analysis system 700 may include or provide a data integrity monitor 760 that implements a rules-based engine that may apply one or more rules 762 to the aggregated usage metrics generated by the usage analysis service 730 to validate the integrity of the aggregated usage metrics. For example, in some embodiments, the data integrity monitor 760 may apply a rule to verify that the current value of a particular usage metric (e.g., the total number of unique devices or application instances for an application) is correct in relation to the current value of another usage metric (e.g., the number of unique devices or application instances for the application in a given time period, e.g. one day or one month). For example, in some implementations, the current value of a first usage metric A (e.g., the number of unique application instances for an application in a day) should always be less than or equal to the current value of a second usage metric B (e.g., the number of unique application instances for the application in a month, or the total number of unique application instances for the application). Thus, if A<=B, then A is valid. If A>B, then A is invalid, and there is a discrepancy between A and B.

In some embodiments, the rules 762 that are applied by the data integrity monitor 760 may specify tolerances for particular metrics, for example to help prevent false positives. For example, in some implementations, the current value of a first usage metric A (e.g., the number of unique application instances for an application in a day) should always be less than or equal to the current value of a second usage metric B (e.g., the number of unique application instances for the application in a month, or the total number of unique application instances for the application), within some tolerance T. Thus, if A<=B+T, then A is considered valid. If A>B+T, then A is invalid, and there is a discrepancy between A and B.

In some embodiments, an appropriate action or actions are taken when a discrepancy is discovered; for example, the provider of the usage analysis service and/or the consumer of the usage information may be notified of the discrepancy. As shown in FIG. 7, in some embodiments, one or more reports 764 may be generated that may indicate discrepancies. The reports 764 may be provided to the operator or manager of the usage analysis service 730 and/or to one or more consumers 770.

In some embodiments, the data integrity monitor 760 may periodically check the integrity of one or more of the aggregated usage metrics for one or more of the applications that are stored in the application usage table 750.

In some embodiments, instead of or in addition to periodically checking the integrity of the metrics, the data integrity monitor 760 may check the integrity of the aggregated usage metrics for an application in response to an access of the application's aggregated usage data by a consumer 770 via the consumer interface 736 of the usage analysis service 760. In some embodiments, a copy of the aggregated usage data 756 accessed by the consumer 770 may be temporarily stored or cached by the data integrity monitor 760 until the data integrity monitor 760 performs its integrity check. Performing the data integrity checks for aggregated usage metrics on copies 756 of data accessed by the consumers 770 may reduce the number of accesses to the application usage table 750. The data integrity checks may be performed on the copies 756 of the accessed data "offline" by the data integrity monitor 760 so that latency is not introduced into the consumers' access of the usage information 774. In addition, since the integrity checks are performed in response to requests for usage data from the consumers 770, the usage analysis system 760 may more easily record and track which consumers 770 are and which are not experiencing discrepancies in their application's aggregated usage metrics, as well as when the consumers 770 are experiencing the discrepancies, which may help in detecting and diagnosing issues in the usage analysis system 760.

In some embodiments, the usage analysis service 730 may provide copies of retrieved usage metrics for two or more applications to the data integrity monitor 760 in response to requests from one or more usage information consumers 770. Instead of performing integrity checks on each copy when received, the data integrity monitor 760 may locally store the copies and periodically (e.g., according to a scheduled interval such as every 30 seconds, once a minute, once an hour, etc.) perform integrity checks on the locally stored copies to determine validity of the usage metrics. A locally stored copy may be deleted or otherwise disposed of once the integrity check has been performed.

In some embodiments, the data integrity monitor 760 and/or the usage analysis service 730 may provide an interface via which one or more entities (e.g., a consumer 770, or an operator or provider of the usage analysis service 730) may implement or modify the rules 762 applied by the data integrity monitor 760. In some embodiments, different rules 762 may be maintained for each of the applications being monitored by the usage analysis system 730 and applied to the usage metrics for the respective applications.

As shown in FIG. 7, in some embodiments, the data integrity monitor 760 may be implemented separately from the usage analysis service 730. In some embodiments, the data integrity monitor 760 may be implemented as a component of the usage analysis service 730. In some embodiments, a data integrity monitor 760 may be implemented on or by a provider network, for example as illustrated in FIG. 9. In some embodiments, a data integrity monitor 760 instance may be implemented on the computing devices used by the consumers 770.

Figure 8:
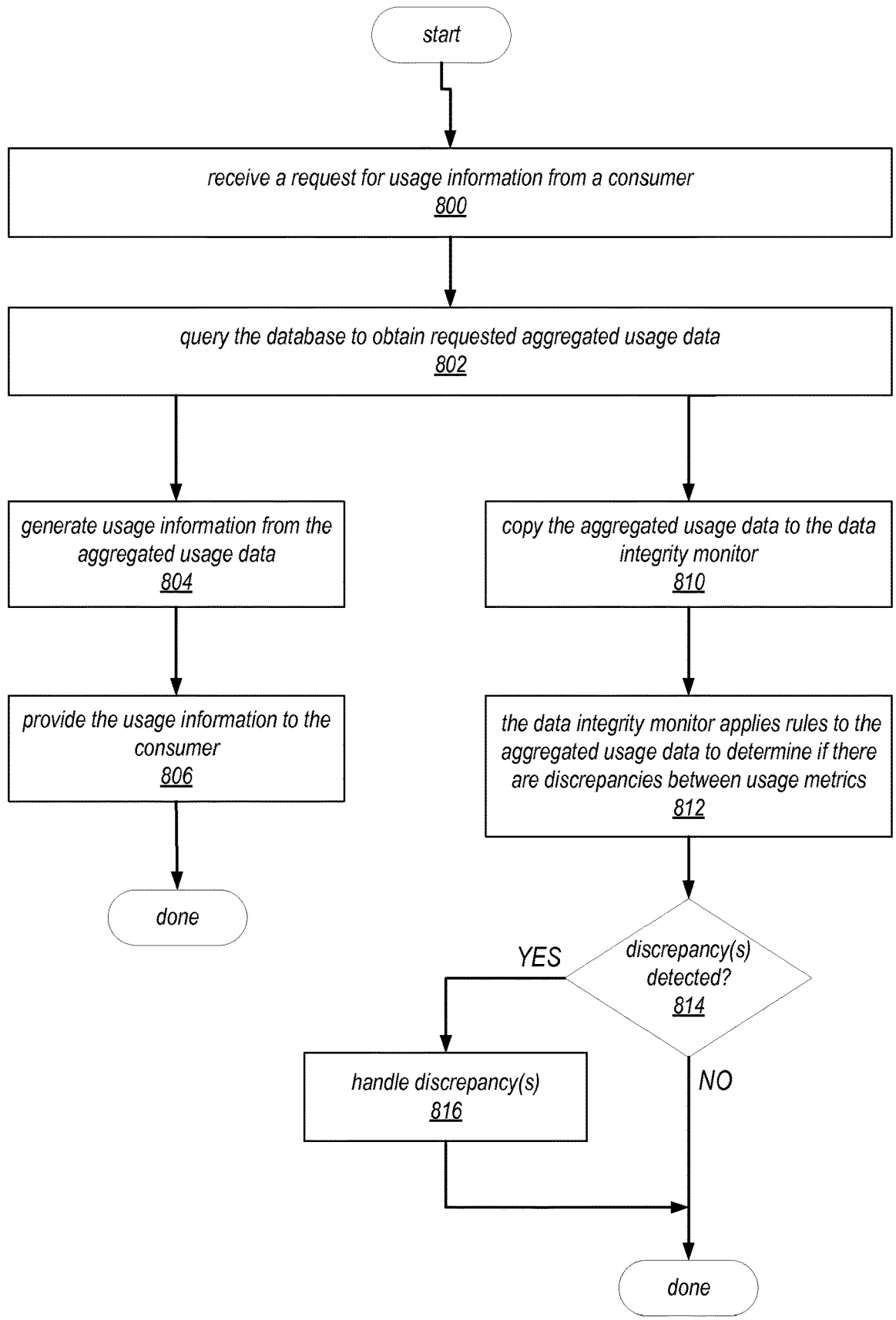
FIG. 8 is a flowchart of a method for monitoring the integrity of aggregated application usage data in a usage analysis system, according to at least some embodiments.

FIG. 8 is a flowchart of a method for monitoring the integrity of aggregated application usage data in a usage analysis system, according to at least some embodiments. The method of FIG. 8 may, for example, be performed. As indicated at 800, a consumer interface component of a usage analysis service may receive a request for usage information of an application from a consumer. As indicated at 802, the usage analysis service may query the database that stores the application usage table to obtain required aggregated usage data from the application's usage record according to the request. As indicated at 804, the consumer interface component of the usage analysis service may generate usage information from the obtained aggregated usage data to satisfy the request, and at 806 may provide the usage information to the consumer, for example via a UI on the consumer's device. As indicated at 810, the obtained aggregated usage data may also be copied to the data integrity monitor by the usage analysis service. As indicated at 812, the data integrity monitor may then apply one or more rules to the aggregated usage data to determine if there are any discrepancies between usage metrics in the data. As an example, if the current value of a usage metric A should be less than or equal to the current value of a usage metric B, then if A<=B, A is valid; otherwise, A is invalid, and there is a discrepancy between A and B. In some embodiments, the rules that are applied may specify tolerances for particular metrics, for example to help prevent false positives. As an example, if the current value of a usage metric A should be less than or equal to the current value of a usage metric B within a tolerance T, then if A<=B+T, A is valid; otherwise, A is invalid, and there is a discrepancy between A and B. At 814, if any discrepancies are detected, then one or more actions may be taken at 816 to handle the detected discrepancies. For example, a report may be automatically generated and sent to one or more entities, for example to an operator of the usage analysis service.

Example Network Environments

This section describes example provider network environments in which embodiments of the methods and apparatus as described in reference to FIGS. 1 through 8 may be implemented. However, these example provider network environments are not intended to be limiting.

Embodiments of systems that implement one or more of the various methods and apparatus as described herein may be implemented in the context of a service provider that provides virtualized resources (e.g., virtualized computing resources, virtualized storage resources, virtualized database (DB) resources, etc.) on a provider network to clients of the service provider, for example as illustrated in FIG. 9. Virtualized resource instances on the provider network 1500 may be provisioned via one or more provider network services, and in some embodiments may be rented, leased, or otherwise provided to clients of the service provider, for example to a usage analysis system provider that implements a usage analysis service 1530 on provider network 1500. At least some of the resource instances on the provider network 1500 may be computing resources implemented according to hardware virtualization technology that enables multiple operating systems to run concurrently on a host computer, i.e. as virtual machines (VMs) on the host. Other resource instances (e.g., storage resources) may be implemented according to one or more storage virtualization technologies that provide flexible storage capacity of various types or classes of storage to clients of the provider network. Other resource instances (e.g., database (DB) resources) may be implemented according to other technologies, for example according to a database service as illustrated in FIG. 11. The service provider may provide other technologies and services on the provider network 1500, for example a streaming service as illustrated in FIG. 10.

In at least some embodiments, the provider network 1500, via provider network services, may enable the provisioning of logically isolated sections of the provider network 1500 to particular clients of the service provider as private networks on the provider network 1500. At least some of a client's resources instances on the provider network 1500 may be provisioned in the client's private network. For example, in FIG. 9, usage analysis service 1530 and/or data integrity monitor 1560 may be implemented as or in a private network implementation that is provisioned on provider network 1500 via one or more of the provider network services.

The provider network 1500 and provider network services may provide flexible provisioning of resource instances to clients in which virtualized computing and/or storage resource instances or capacity can be automatically added to or removed from a client's configuration on the provider network 1500 in response to changes in demand or usage, thus enabling a client's implementation on the provider network 1500 to automatically scale to handle computation and/or data storage needs. For example, one or more additional computing and/or storage resources may be automatically added to components or modules of usage analysis service 1530 in response to an increase in the number of devices 1580 generating session events. In some embodiments, if and when usage drops below a threshold, computing and storage resources that are no longer necessary can be removed.

Provider network services may include but are not limited to, one or more hardware virtualization services for provisioning computing resource, one or more storage virtualization services for provisioning storage resources, and one or more database (DB) services for provisioning DB resources. In some implementations, one, two, or more of these provider network services may be leveraged to provision and manage respective resource instances in usage analysis service 1530 and/or data integrity monitor 1560. In at least some embodiments, one or more provider network services of the provider network 1500 may be leveraged to manage the deployment, scaling, load balancing, monitoring, management, fault detection and recovery, and other functionalities of the usage analysis service 1530 and/or data integrity monitor 1560 logic, modules, components, and resource instances. Via the provider network services, the usage analysis service 1530 and/or data integrity monitor 1560 can be dynamically scaled to handle computational and storage needs in response to fluctuations in devices 1580 and consumers 1570 participating in the usage analysis system.

Streaming Service Example

The following describes an example ordered streaming service that may be used to provide partitioned processing of data in some embodiments of a usage analysis system. In some embodiments, the ordered streaming service may be leveraged to provide key-based partitioning and ordered processing of session event data, instance update data, and/or application usage update data in streams, for example as illustrated in FIGS. 2A, 2B, and 3. The ordered streaming service may also facilitate decoupling of the session event processing component from the application usage update processing component, allowing the components of the usage analysis service to be independently scaled.

FIG. 10 illustrates an example streaming service that may be used to provide partitioned processing of application instance update data and/or application usage update data in at least some embodiments of a usage analysis system. Streaming service 1610 may provide key-based partitioning and ordered processing of data in streams. The streaming service 1610 may provide an API 1620A via which producers 1600 may input data records to the streaming service, indicating the field(s) of the data records to be used as the partition key for the stream. The streaming service 1610 may then partition the data records to respective partitions 1630 of the stream according to the partition key. The streaming service 1610 maintains ordering of the data records in the partitions 1630. One or more consumers 1680 may then read the ordered data records from the partitions 1630, for example according to an API 1620B.

Data Storage Service Example

The following describes an example database service or data storage service that may be used as the data storage service in some embodiments of a usage analysis system.

A Web-based service is described that provides database services to clients (e.g., user, subscribers, or client applications that access the data storage service on behalf of users or subscribers). The database service may in some embodiments support the seamless scaling of tables that are maintained on behalf of clients in a non-relational data store, e.g., a non-relational database. The database service may provide a high level of durability and availability through replication, in some embodiments. In some embodiments, the database service itself may not impose a maximum table size or maximum throughput limits, and may not require client-side partitioning, even for tables having a massive scale. The database service may support automatic live repartitioning of data in response to the detection of various anomalies (e.g., failure or fault conditions, hot spots, or increases in table size and/or service request throughput), and/or explicit (e.g., pro-active and/or subscriber-initiated) live repartitioning of data to support planned or anticipated table size and/or throughput increases. In other words, the database service may in some embodiments initiate the re-sizing (scaling) and/or repartitioning of a table in response to receiving one or more requests to store, retrieve, modify, or delete items in the scaleable table.

The database service may in various embodiments support a flexible schema, a plurality of available consistency models, a variety of service level and/or business model options, multiple indexing options, and/or multiple query types. In some embodiments, clients (e.g., users, subscribers or client applications) may interact with the database service through a Web service interface using a relatively small (and relatively simple) set of APIs, such that clients of the service are largely relieved from the burden of database administration. The database service may exhibit low latency in servicing requests. Unlike in some prior data storage services, the database service may provide predictable performance at a low cost, while supporting multi-tenancy and automatic heat management.

In various embodiments, the database service may provide an application programming interface (API) that includes support for some or all of the following operations on the data in a table maintained by the service on behalf of a client: put (or store) an item, get (or retrieve) one or more items having a specified primary key, delete an item, update the attributes in a single item, query for items using an index, and scan (e.g., list items) over the whole table, optionally filtering the items returned. In some embodiments, the database service (and/or the underlying system that implements the database service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, the database service (and/or the underlying system) may impose an upper bound on the size of an individual item, e.g., to allow the database service to store the entire contents of an item in a single partition in the underlying data storage system. This may, in turn, facilitate performing atomic updates to an item without dramatically reducing throughput, and may make it easier to maintain item contents in a stable working set. In other words, limiting the size of an individual item may facilitate both strong consistency and high performance in the system, in some embodiments.

In at least some embodiments, the database service may be a fast, fully managed NoSQL, non-relational database service that makes it simple and cost-effective to store and retrieve any amount of data, and to serve any level of request traffic. In at least some embodiments, the NoSQL database service may provide databases as key-value stores for clients' data. The key-value stores provided by the NoSQL database service allow clients to store their data without fixed schemas. In at least some embodiments, all data items are stored on Solid State Drives (SSDs). In at least some embodiments, all data items may be replicated, for example across three locations, for high availability and durability.

One embodiment of a system architecture that is configured to implement a Web services-based database service is illustrated in FIG. 11. It is noted that where one or more instances of a given component may exist, reference to that component may be made in either the singular or the plural. However, usage of either form is not intended to preclude the other. In various embodiments, the components illustrated in FIG. 11 may be implemented directly within computer hardware, as instructions directly or indirectly executable by computer hardware (e.g., a microprocessor or computer system), or using a combination of these techniques. For example, the components of FIG. 11 may be implemented by a distributed system including a number of computing nodes (or simply, nodes), such as the computer node or system embodiment illustrated in FIG. 12 and discussed below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 1710*a*-1710*n* may encompass any type of client configurable to submit web services requests to Web services platform 1730 via network 1720. For example, a given storage service client 1710 may include a suitable version of a web browser, or a plugin module or other type of code module configured to execute as an extension to or within an execution environment provided by a web browser to provide storage service clients (e.g., client applications, users, and/or subscribers) access to the data storage services provided by Web services platform 1730. Alternatively, a storage service client 1710 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 1710 may be an application configured to interact directly with Web services platform 1730. In various embodiments, storage service client 1710 may be configured to generate web services requests according to a Representational State Transfer (REST)-style web services architecture, a document- or message-based web services architecture, or another suitable web services architecture.

In some embodiments, storage service client 1710 may be configured to provide access to web services-based storage to other applications in a manner that is transparent to those applications. For example, storage service client 1710 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 1730 may be coordinated by storage service client 1710 and the operating system or file system on behalf of applications executing within the operating system environment.

Storage service clients 1710 may convey web services requests to and receive responses from Web services platform 1730 via network 1720. In various embodiments, network 1720 may encompass any suitable combination of networking hardware and protocols necessary to establish web-based communications between clients 1710 and platform 1730. For example, network 1720 may generally encompass the various telecommunications networks and service providers that collectively implement the Internet. Network 1720 may also include private networks such as local area networks (LANs) or wide area networks (WANs) as well as public or private wireless networks. For example, both a given client 1710 and Web services platform 1730 may be respectively provisioned within enterprises having their own internal networks. In such an embodiment, network 1720 may include the hardware (e.g., modems, routers, switches, load balancers, proxy servers, etc.) and software (e.g., protocol stacks, accounting software, firewall/security software, etc.) necessary to establish a networking link between given client 1710 and the Internet as well as between the Internet and Web services platform 1730. It is noted that in some embodiments, storage service clients 1710 may communicate with Web services platform 1730 using a private network rather than the public Internet. For example, clients 1710 may be provisioned within the same enterprise as the database service (and/or the underlying system) described herein. In such a case, clients 1710 may communicate with platform 1730 entirely through a private network 1720 (e.g., a LAN or WAN that may use Internet-based communication protocols but which is not publicly accessible).

Generally speaking, Web services platform 1730 may be configured to implement one or more service endpoints configured to receive and process web services requests, such as requests to access tables maintained on behalf of clients/users by a database service, and/or the items and attributes stored in those tables. For example, Web services platform 1730 may include hardware and/or software configured to implement various service endpoints and to properly receive and process HTTP-based web services requests directed to those endpoints. In one embodiment, Web services platform 1730 may be implemented as a server system configured to receive web services requests from clients 1710 and to forward them to various components that collectively implement a database system for processing. In other embodiments, Web services platform 1730 may be configured as a number of distinct systems (e.g., in a cluster topology) implementing load balancing and other request management features configured to dynamically manage large-scale web services request processing loads.

As illustrated in FIG. 11, Web services platform 1730 may include a front end module 1740 (which may be configured to receive, authenticate, parse, throttle and/or dispatch service requests, among other things), one or more administrative components, or auto admin instances, 1750 (which may be configured to provide a variety of visibility and/or control functions, as described in more detail below), and a plurality of storage node instances (shown as 1760a-1760n), each of which may maintain and manage one or more tables on behalf of clients/users or on behalf of the database service (and its underlying system) itself. Some of the functionality provided by each of these types of components is described in more detail below, according to various embodiments.

In various embodiments, Web services platform 1730 may be configured to support different types of web services requests. For example, in some embodiments, platform 1730 may be configured to implement a particular web services application programming interface (API) that supports a variety of operations on tables that are maintained and managed on behalf of clients/users by the database service system (and/or data stored in those tables). Examples of the operations supported by such an API are described in more detail below.

In addition to functioning as an addressable endpoint for clients' web services requests, in some embodiments Web services platform 1730 may implement various client management features. For example, platform 1730 may coordinate the metering and accounting of client usage of web services, including storage resources, such as by tracking the identities of requesting clients 1710, the number and/or frequency of client requests, the size of tables and/or items stored or retrieved on behalf of clients 1710, overall storage bandwidth used by clients 1710, class of storage requested by clients 1710, and/or any other measurable client usage parameter. Platform 1730 may also implement financial accounting and billing systems, or may maintain a database of usage data that may be queried and processed by external systems for reporting and billing of client usage activity. In some embodiments, platform 1730 may include a lock manager and/or a bootstrap configuration (not shown).

In various embodiments, a database service may be implemented on one or more computing nodes that are configured to perform the functionality described herein. In some embodiments, the service may be implemented by a Web services platform (such as Web services platform 1730 in FIG. 11) that is made up of multiple computing nodes, each of which may perform one or more of the functions described herein. Various collections of the computing nodes may be configured to provide the functionality of an auto-admin cluster, a cluster of resources dedicated to the database service, and a collection of external resources (which may be shared with other Web services or applications, in some embodiments).

In some embodiments, the external resources with which the system interacts to provide the functionality described herein may include a simple workflow component, illustrated in FIG. 11 as simple workflow component 1770. Simple workflow component 1770 may provide a framework through which other components interact with the simple workflow system. In some embodiments, Web services platform 1730 may include an access API built on top of that framework (not shown). This interface may allow the system to implement APIs suitable for the usage patterns that are expected to be experienced by the database service. In some embodiments, components or modules of the system that use simple workflow component 1770 may include these interfaces rather than interfacing directly to the interfaces provided by simple workflow component 1770. In some embodiments, the Web services platform 1730 may rely on one or more external resources, such as an external storage service 1780, and/or other external (and in some cases shared) external resources, in addition to a simple workflow component 1770. In some embodiments, simple workflow component 1770 may be used to perform distributed operations, such as those that extend beyond a particular partition replication group.

Illustrative System

Figure 12:
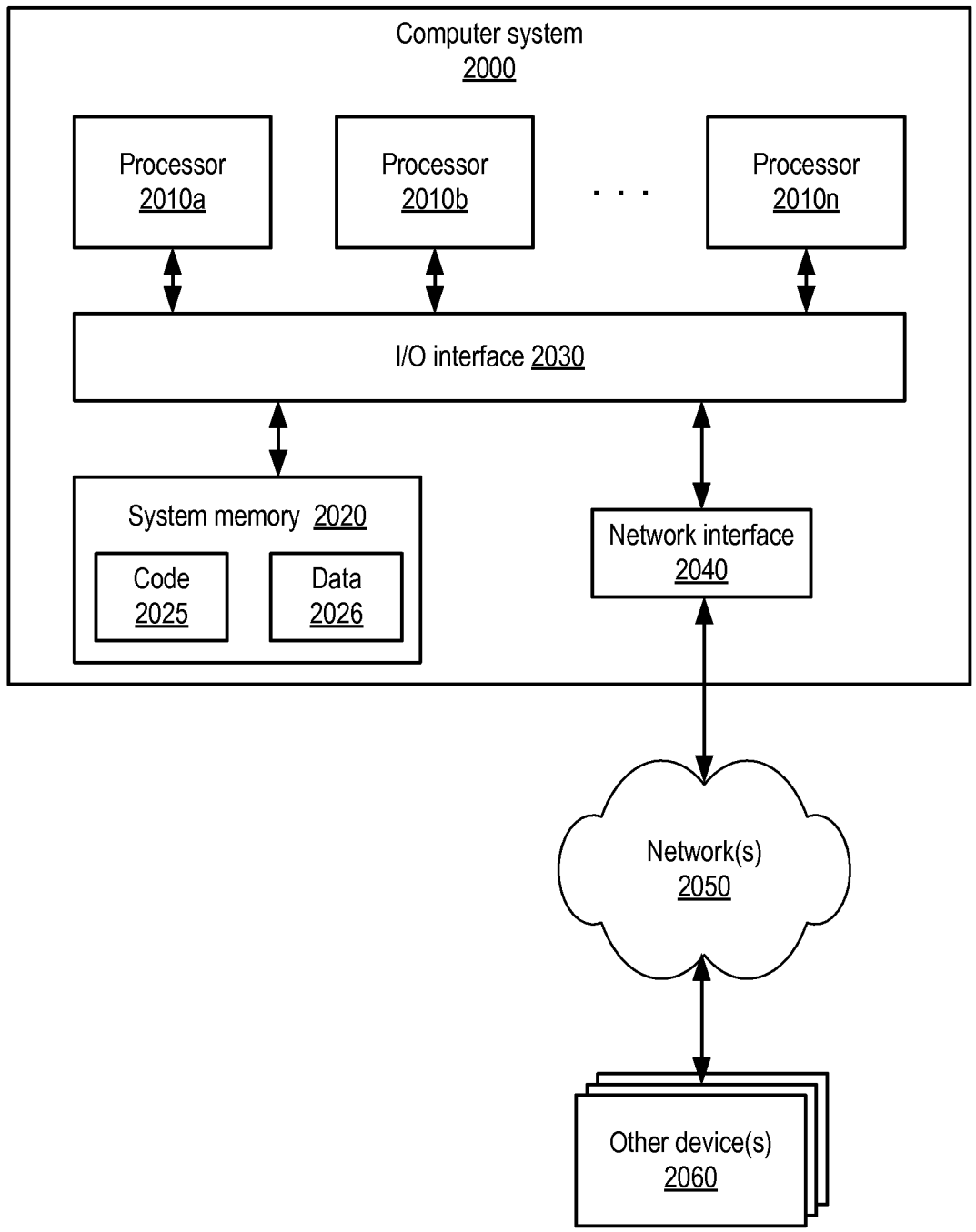
FIG. 12 is a block diagram illustrating an example computer system that may be used in some embodiments.

In at least some embodiments, a computing device that implements a portion or all of the methods and apparatus as described herein may include a general-purpose computer system that includes or is configured to access one or more computer-accessible media, such as computer system 2000 illustrated in FIG. 12. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), dynamic RAM (DRAM), synchronous dynamic RAM (SDRAM), nonvolatile/Flash-type memory, or any other type of memory. In the illustrated embodiment, program instructions and data implementing one or more desired functions, such as those methods, techniques, and data described above in reference to FIGS. 1 through 11, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 11, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above with reference to FIGS. 1 through 11 for implementing embodiments of usage analysis systems. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more memory or storage devices to implement a data store that stores an application usage table comprising a plurality of records, each record corresponding to a particular one of a plurality of applications and including one or more aggregated usage metrics for the respective application;
one or more computing devices, comprising one or more hardware processors and associated memory, configured to implement one or more session event nodes configured to:
generate updates for the records in the application usage table according to session events received from a plurality of devices of a plurality of users, each session event indicating new usage data for a respective application instance on a respective device, and each update including an application identifier indicating one of the plurality of applications and increments for the one or more aggregated usage metrics of the respective application, wherein, for at least one of the plurality of applications, the session events received from two or more different devices of two or more different users indicate new usage data for two or more different application instances of the same application, and wherein the updates are generated as the session events are received; and partition the updates into a plurality of partitions according to the application identifier;

a plurality of computing devices, each comprising one or more hardware processors and associated memory, configured to implement a plurality of application usage update nodes distinct from the one or more session event nodes, each application usage update node associated with a different one of the plurality of partitions, and responsible for updating a different one of the records in the application usage table according to the updates from its associated partition, and each application usage update node configured to:

obtain the updates from the respective different one of the plurality of partitions; and apply the updates to the respective different one of the plurality of records in the application usage table corresponding to the respective particular one of the plurality of applications;

wherein the updates obtained and applied by at least one of the plurality of application usage update nodes to the respective different one of the plurality of records corresponds to session events received, by one or more of the session event nodes, from two or more different devices of two or more different users.

2. The system as recited in claim 1, wherein each application usage update node is further configured to combine two or more of the updates obtained from the respective partition to generate a combined update, and wherein, to apply the updates to the respective record in the application usage table, the application usage update node applies the combined update to the respective record in the application usage table.

3. The system as recited in claim 1, wherein the plurality of application usage update nodes are configured to perform said obtaining and said applying according to a batch update interval.

4. The system as recited in claim 1, wherein the data store further stores an instances table comprising a plurality of instance records, each instance record corresponding to an instance of one of the plurality of applications on one of the plurality of devices and including one or more usage metrics for the respective application instance on the respective device, and wherein the session event nodes are further configured to update the instance records in the instances table according to the received session events.

5. The system as recited in claim 4, wherein, to update the instance records in the instances table according to the received session events, the session event nodes are configured to:

generate instance updates according to the session events, each instance update including an application instance identifier indicating a particular application instance and updates for one or more instance usage metrics of the respective application instance; and partition the instance updates into a plurality of instance update partitions according to the application instance identifier;

wherein the system further comprises one or more computing devices configured to implement a plurality of instance update nodes, each instance update node corresponding to one of the instance records in the instances table, and each instance update node configured to:

obtain the instance updates from a respective one of the plurality of instance update partitions; and apply the instance updates to a respective one of the instance records in the instances table.

6. The system as recited in claim 1, wherein the data store is provided by an database service, wherein each application usage update node is configured to apply the updates to the respective record in the application usage table via an application programming interface (API) of the database service.

7. The system as recited in claim 1, wherein, to partition the updates into a plurality of partitions according to the application identifier, the one or more session event nodes are configured to send the updates to a streaming service via an application programming interface (API) of the streaming service, wherein the streaming service puts the updates into the respective partitions using the application identifier in the updates as a partition key; and wherein, to obtain the updates from a respective one of the plurality of partitions, each application usage update node is configured to read the updates from the respective partition via the API of the streaming service.

8. The system as recited in claim 1, further comprising one or more computing devices configured to implement a consumer interface for data stored in the application usage table, wherein the consumer interface is configured to:

receive requests for application usage information from one or more usage information consumers;

retrieve aggregated usage metrics from one or more of the records in the application usage table according to the requests;

generate the requested application usage information at least in part according to the retrieved aggregated usage metrics; and provide the requested application usage information to respective ones of the one or more usage information consumers.

9. A method, comprising:

generating, by one or more session event nodes implemented on one or more computing devices, updates for a plurality of application usage records according to session events received from a plurality of devices of a plurality of users, each session event indicating new usage data for a respective application instance on a respective device of a respective user, and each update including an application identifier indicating one of a plurality of applications and increments for one or more aggregated usage metrics of the respective application, wherein, for at least one of the plurality of applications, the one or more session event nodes receives a plurality of session events from two or more different devices of two or more different users indicating new usage data for two or more different application instances of the same application, and wherein the updates are generated as the session events are received;

partitioning, by the one or more session event nodes, the updates into a plurality of partitions according to the application identifier; and applying, by a plurality of application usage update nodes distinct from the one or more session event nodes, batches of the updates from the partitions to respective ones of the plurality of application usage records, each application usage record corresponding to a particular one of the plurality of applications and including one or more aggregated usage metrics for the respective application, wherein each application usage update node is associated with a different partition of the plurality of partitions, and applies updates from the different partition of the plurality of partitions to a different one of the plurality of application usage records;

wherein the updates obtained and applied by at least one of the plurality of application usage update nodes to the respective different one of the plurality of application usage records corresponds to session events received, by one or more of the session event nodes, from two or more different devices of two or more different users.

10. The method as recited in claim 9, further comprising combining two or more of the updates in a respective partition to generate a combined update, and wherein said applying batches of the updates from the partitions to respective ones of a plurality of application usage records comprises applying the combined updates to the respective records.

11. The method as recited in claim 9, wherein said applying batches of the updates from the partitions to respective ones of a plurality of application usage records is performed according to a batch update interval.

12. The method as recited in claim 9, further comprising updating a plurality of instance records according to the received session events, wherein each instance record corresponds to an instance of one of the plurality of applications on one of the plurality of devices and includes one or more usage metrics for the respective application instance on the respective device.

13. The method as recited in claim 12, wherein said updating a plurality of instance records according to the received session events comprises:

generating instance updates according to the session events, each instance update including an application instance identifier indicating a particular application instance and updates for one or more instance usage metrics of the respective application instance;

partitioning the instance updates into a plurality of instance update partitions according to the application instance identifier; and applying the instance updates from the instance update partitions to respective ones of the instance records.

14. The method as recited in claim 13, wherein said applying the instance updates from the instance update partitions to respective ones of the instance records is performed according to a batch update interval.

15. The method as recited in claim 9, wherein said partitioning the updates into a plurality of partitions according to the application identifier comprises sending the updates to a streaming service that places the updates into the respective partitions using the application identifier as a partition key.

16. The method as recited in claim 15, wherein said applying batches of the updates from the partitions to respective ones of a plurality of application usage records comprises reading the updates from the respective partitions via the API of the streaming service.

17. A non-transitory computer-readable storage medium storing program instructions that when executed on one or more computers cause the one or more computers to implement a usage analysis system comprising:

one or more session event nodes configured to:

generate updates for a plurality of records in an application usage table according to session events received from a plurality of devices of a plurality of users, each session event indicating new usage data for a respective application instance on a respective device of a respective user, and each update including an application identifier indicating one of a plurality of applications and increments for one or more aggregated usage metrics of the respective application, wherein, for at least one of the plurality of applications, the session events from two or more different devices of two or more different users indicate new usage data for two or more different application instances of the same application, and wherein the updates are generated as the session events are received; and partition the updates into a plurality of partitions according to the application identifier;

a plurality of application usage update nodes distinct from the one or more session event nodes configured to:

obtain the updates from respective ones of the plurality of partitions; and apply the updates to respective ones of the plurality of records in the application usage table, each record in the application usage table corresponding to a particular one of the plurality of applications and including one or more aggregated usage metrics for the respective application, wherein each application usage update node is associated with a different partition of the plurality of partitions, and applies updates from the different partition to a different record of the plurality of records;

wherein the updates obtained and applied by at least one of the plurality of application usage update nodes to the respective different one of the plurality of records corresponds to session events received, by one or more of the session event nodes, from two or more different devices of two or more different users.

18. The non-transitory computer-accessible storage medium as recited in claim 17, wherein the one or more session event nodes are further configured to:

generate instance updates according to the session events, each instance update including an application instance identifier indicating a particular application instance and updates for one or more instance usage metrics of the respective application instance; and partition the instance updates into a plurality of instance update partitions according to the application instance identifier;

wherein the usage analysis system further comprises a plurality of instance update nodes configured to:

obtain the instance updates from respective ones of the plurality of instance update partitions; and apply the instance updates to respective ones of a plurality of instance records in an instances table, each instance record in the instances table corresponding to an instance of one of the plurality of applications on one of the plurality of devices and including one or more usage metrics for the respective application instance on the respective device.

19. The non-transitory computer-accessible storage medium as recited in claim 17, wherein the application usage update nodes are further configured to combine updates obtained from the partitions to generate combined updates, and wherein, to apply the updates to respective ones of a plurality of records in an application usage table, the application usage update nodes apply the combined updates to the respective records in the application usage table.

20. The non-transitory computer-accessible storage medium as recited in claim 17, wherein the plurality of application usage update nodes are configured to perform said obtaining and said applying according to a batch update interval.

* * * * *